US011763257B1

(12) United States Patent
Mitevski et al.

(10) Patent No.: US 11,763,257 B1
(45) Date of Patent: Sep. 19, 2023

(54) GROUP INVENTORY MANAGEMENT FOR A NETWORK TRAFFIC SURGE RESISTANT PLATFORM

(71) Applicant: Fevo, Inc., New York, NY (US)

(72) Inventors: Vladimir Mitevski, New York, NY (US); Ari Daie, New York, NY (US)

(73) Assignee: Fevo, Inc., New York, NY (US)

( * ) Notice: Subject to any disclaimer, the term of this patent is extended or adjusted under 35 U.S.C. 154(b) by 0 days.

(21) Appl. No.: 18/071,028

(22) Filed: Nov. 29, 2022

Related U.S. Application Data

(63) Continuation-in-part of application No. 17/865,951, filed on Jul. 15, 2022, and a continuation-in-part of application No. 17/865,933, filed on Jul. 15, 2022, and a continuation-in-part of application No. 17/865,906, filed on Jul. 15, 2022, and a continuation-in-part of application No. 17/865,989, filed on Jul. 15, 2022, now Pat. No. 11,636,512, and a continuation-in-part of application No. 17/865,893, filed on Jul. 15, 2022.

(51) Int. Cl.
*G06Q 30/00* (2023.01)
*G06Q 10/087* (2023.01)
*G06Q 30/0601* (2023.01)

(52) U.S. Cl.
CPC ....... *G06Q 10/087* (2013.01); *G06Q 30/0611* (2013.01); *G06Q 30/0633* (2013.01)

(58) Field of Classification Search
CPC ............. G06Q 10/087; G06Q 30/0611; G06Q 30/0633
See application file for complete search history.

(56) References Cited

U.S. PATENT DOCUMENTS

| | | | |
|---|---|---|---|
| 10,846,691 B1* | 11/2020 | Girdhar | G06Q 20/12 |
| 11,288,697 B1* | 3/2022 | Sampey | G06Q 20/204 |
| 11,429,966 B1* | 8/2022 | Adam | G06Q 20/401 |
| 2003/0105672 A1* | 6/2003 | Epstein | G06Q 20/04 |
| | | | 705/17 |
| 2005/0177442 A1* | 8/2005 | Sullivan | G06Q 10/087 |
| | | | 705/16 |

(Continued)

FOREIGN PATENT DOCUMENTS

WO    WO-2023278415 A1 *  1/2023  ......... G06F 16/9577

*Primary Examiner* — Luis A Brown
(74) *Attorney, Agent, or Firm* — McDonald Hopkins LLC; James P. Muraff

(57) ABSTRACT

Systems and methods to manage surge network traffic to an electronic commerce platform are described. The platform provider generates a static package that is placed in networked storage that is accessible through a web service interface. The package contains the information required to instantiate and render the interface of the service-hosting platform using the processor and resources of the computer that accesses the package via a browser. Based on the contents of the package, the rendered interface presents the services of the service-hosting platform using resources of the customer's computer without making any calls to a server to query a protected backend system. The inventory may be refreshed from time-to-time without causing traffic directed at the service-hosting platform. Access to the protected backend resources and platform resources is gated by threshold actions taken by the user.

20 Claims, 11 Drawing Sheets

(56) References Cited

U.S. PATENT DOCUMENTS

| | | | |
|---|---|---|---|
| 2008/0114650 A1* | 5/2008 | Ku | G06Q 30/0213 705/14.23 |
| 2008/0114654 A1* | 5/2008 | McGrath | G06Q 30/0603 705/14.39 |
| 2011/0137706 A1* | 6/2011 | Howard | G06Q 30/0246 705/7.29 |
| 2011/0173095 A1* | 7/2011 | Kassaei | G06Q 30/02 705/26.7 |
| 2011/0196853 A1* | 8/2011 | Bigham | G06F 8/35 707/706 |
| 2011/0238497 A1* | 9/2011 | Milne | G06Q 30/0251 705/14.49 |
| 2013/0092731 A1* | 4/2013 | Pettersson | G06K 19/08 235/375 |
| 2013/0124287 A1* | 5/2013 | Bjorn | G06Q 30/0222 705/14.23 |
| 2013/0138496 A1* | 5/2013 | Jin | G06Q 30/02 705/14.26 |
| 2013/0151323 A1* | 6/2013 | Shepard | G06Q 30/0222 705/14.23 |
| 2014/0074584 A1* | 3/2014 | Fisher | G06Q 30/0207 705/14.39 |
| 2014/0257955 A1* | 9/2014 | Powell | G06Q 30/06 705/14.23 |
| 2015/0248664 A1* | 9/2015 | Makhdumi | G06Q 20/3274 235/380 |
| 2015/0295920 A1* | 10/2015 | Van Kerrebroeck | G07F 7/0826 726/9 |
| 2016/0042388 A1* | 2/2016 | Chater | H04L 67/535 705/14.45 |
| 2017/0134385 A1* | 5/2017 | Mitevski | H04L 67/143 |
| 2017/0300960 A1* | 10/2017 | Khvostov | G06Q 30/0246 |
| 2017/0300961 A1* | 10/2017 | Khvostov | G06Q 30/0246 |
| 2018/0013840 A1* | 1/2018 | Mitevski | H04L 63/1441 |
| 2018/0082054 A1* | 3/2018 | Khwaja | H04L 63/0428 |
| 2018/0137480 A1* | 5/2018 | Houghton, IV | G06F 1/1694 |
| 2019/0073729 A1* | 3/2019 | Cheng-Shorland | G06Q 30/0645 |
| 2019/0122203 A1* | 4/2019 | Kumawat | G06Q 20/382 |
| 2020/0394705 A1* | 12/2020 | Daie | G06Q 10/087 |
| 2021/0133760 A1* | 5/2021 | Lew | G06Q 20/425 |
| 2021/0279766 A1* | 9/2021 | Garrett | G06Q 20/127 |
| 2021/0288806 A1* | 9/2021 | Wakita | H04L 9/3242 |
| 2021/0390560 A1* | 12/2021 | Kojima | G06Q 20/3274 |
| 2022/0067733 A1* | 3/2022 | White | G06Q 20/3267 |
| 2022/0237647 A1* | 7/2022 | L'Huillier | G06Q 20/355 |
| 2022/0300970 A1* | 9/2022 | Mudumbai Srinivasa | G06K 19/06028 |

* cited by examiner

FIG. 5B

GROUP INVENTORY MANAGEMENT FOR A NETWORK TRAFFIC SURGE RESISTANT PLATFORM

RELATED APPLICATIONS

This application is related to U.S. Patent Application No. WW/WWW,WWW entitled "INVENTORY MANAGEMENT SYSTEM PROTECTION FOR NETWORK TRAFFIC SURGE RESISTANT PLATFORM", filed on the same day. This application is also a continuation-in-part of U.S. patent application Ser. No. 17/865,893 entitled "NETWORK TRAFFIC SURGE RESISTANT PLATFORM," filed on Jul. 15, 2022, U.S. patent application Ser. No. 17/865,906 entitled "DYNAMIC USER INTERFACE FOR A NETWORK TRAFFIC SURGE RESISTANT PLATFORM," filed on the Jul. 15, 2022, U.S. patent application Ser. No. 17/865,933 entitled "INVENTORY MANAGEMENT FOR A NETWORK TRAFFIC SURGE RESISTANT PLATFORM," filed on Jul. 15, 2022, U.S. patent application Ser. No. 17/865,951 entitled "INVENTORY MANAGEMENT SYSTEM PROTECTION FOR NETWORK TRAFFIC SURGE RESISTANT PLATFORM," filed on Jul. 15, 2022, and U.S. patent application Ser. No. 17/865,989 entitled "INVENTORY MANAGEMENT SYSTEM PROTECTION FOR NETWORK TRAFFIC SURGE RESISTANT PLATFORM," filed on Jul. 15, 2022, each of which is herein incorporated by reference in their entirety.

TECHNICAL FIELD

The present invention is generally related to webhosting of electronic commerce and, more specifically, management of surge network traffic to an electronic commerce platform.

BACKGROUND

Purchasing high demand goods and/or services, such as popular toys or event tickets, can be frustrating for consumers and potentially debilitating for electronic commerce platform providers. Increasingly, merchants use flash sales or other such events where all or part of the available inventory is, for a limited amount of time, offered to a group of people at a special price and/or is offered as an opportunity to purchase before the general public. Merchants may use such events to offer benefits to a particular group of customers (e.g., premium members, students, faculty, etc.), as a form of price differentiation, and/or to capture the attention of highly motivated customers, etc. Sometimes, instead of a preplanned event, consumer interest in a good or service is so high that a similar surge in traffic is generated upon an initial offer of the good or service. In such scenarios, instead of managing infrastructure (e.g., servers, databases, network bandwidth, etc.) for mean site traffic, the merchant's site must be configured to handle relatively infrequent surges of high network traffic volume that include a large number of requests into the merchant's backend infrastructure. For example, a flash sale can act like a denial of service attack, but where the traffic is legitimate. Often, backend systems, such as inventory management systems, are built with older technology that cannot handle the massive volume of queries into its databases. Such backend systems can be overwhelmed by these high traffic value events.

SUMMARY

Systems and methods for providing an electronic commerce platform that manages surges of high network traffic volume while protecting backend computing resources are described herein. For an offer of goods and/or services, the platform provider generates a static package that is placed in networked storage (e.g., networked object storage, etc.) that is accessible through a web service interface. The package contains the information required to instantiate and render the interface of the store, as well as information that is necessary to complete a transaction. When the offer is electronically communicated via a link, the linked location on the merchant platform's server includes just enough HTML instructions to retrieve the package from the storage and instantiate the interface. Based on the contents of the package, the interface of the merchant platform is then rendered in the browser of the customer using the processor and resources of the customer's computer (e.g., not resources of a server of the merchant platform). During this process, the graphical elements of the interface may be retrieved from the networked storage. Based on the contents of the package, the rendered interface presents available inventory and performs cart management (e.g., presenting available inventory, selecting/deselecting goods and/or services to be placed in the cart, etc.) using resources of the customer's computer without making any calls to a server to query an inventory management system. The interface only performs backend calls (e.g., calls to the merchant platform server, etc.) when necessary to complete the next stage of the transaction (e.g., after the customer takes an affirmative step in the transaction). For example, when the customer clicks on an action button that signals that they desire to proceed with checking out, a call to an inventory server to query the relevant inventory management system(s) is made to place a temporary hold on the desired inventory. The rendered interface collects information to authenticate the identity of the customer and collects payment information. The interface then performs backend calls to the relevant system (e.g., the payments system, the customer management system, etc.) to verify the customer's information and process the payment. After, the payment is processed and the customer is identified, the merchant platform makes a call to the inventory management system to reserve the goods and/or services for the customer.

The available inventory for the browser by the cart interface is included in the offer package. When the user's computing device instantiates the cart interface based on the offer package, the cart interface includes the available inventory. Inventory updates are not provided directly by the commerce platform to the computing device. Often customers wish to select specific items when the items they are shopping for are not fungible. For example, a customer may desire to select specific seats when attending an event. The available inventory is included in the offer package and is pre-processed such that when the user's computing device instantiates the cart interface based on the offer package, the cart interface is able to offer selections of a specific item or a group of specific items based on selection rules in the instantiating script while preventing stranded inventory. The cart interface may curate inventory based on the selection rules and may not all offer inventory that meets the customer's criteria.

An example network traffic surge resistant system includes network storage and one or more servers configured as a commerce platform. The commerce platform generates a script, a first offer package, and an offer instantiator, and stores the script and the first offer package onto the network storage. The offer instantiator provides the location of the script and the first offer package in the network storage. The offer package includes a set of inventory slices that each specify group ticket data of contiguous seats represented in the inventory slice. In response to a browser operating on a computing device accessing the offer instantiator, the offer instantiator causes the browser to retrieve the script and the offer package from the network storage. The script causes the browser to instantiate a cart interface within the browser based on the offer package using the resources of the computing device without making a backend call to the commerce platform, the cart interface including a set of inventory items based on the first set of inventory slices. In response to receiving a selection of a quantity of the inventory items associated with one of the inventory slices, the script causes the browser to present, in the cart interface, at least one group of seats for selection based on group ticket data and contiguity rules included in the offer package.

BRIEF DESCRIPTION OF THE DRAWINGS

Operation of the present disclosure may be better understood by reference to the following detailed description taken in connection with the following illustrations, wherein:

FIGS. 5A and 5B illustrate example cart interfaces, according to the teachings of this disclosure.

DETAILED DESCRIPTION

Figure 1:
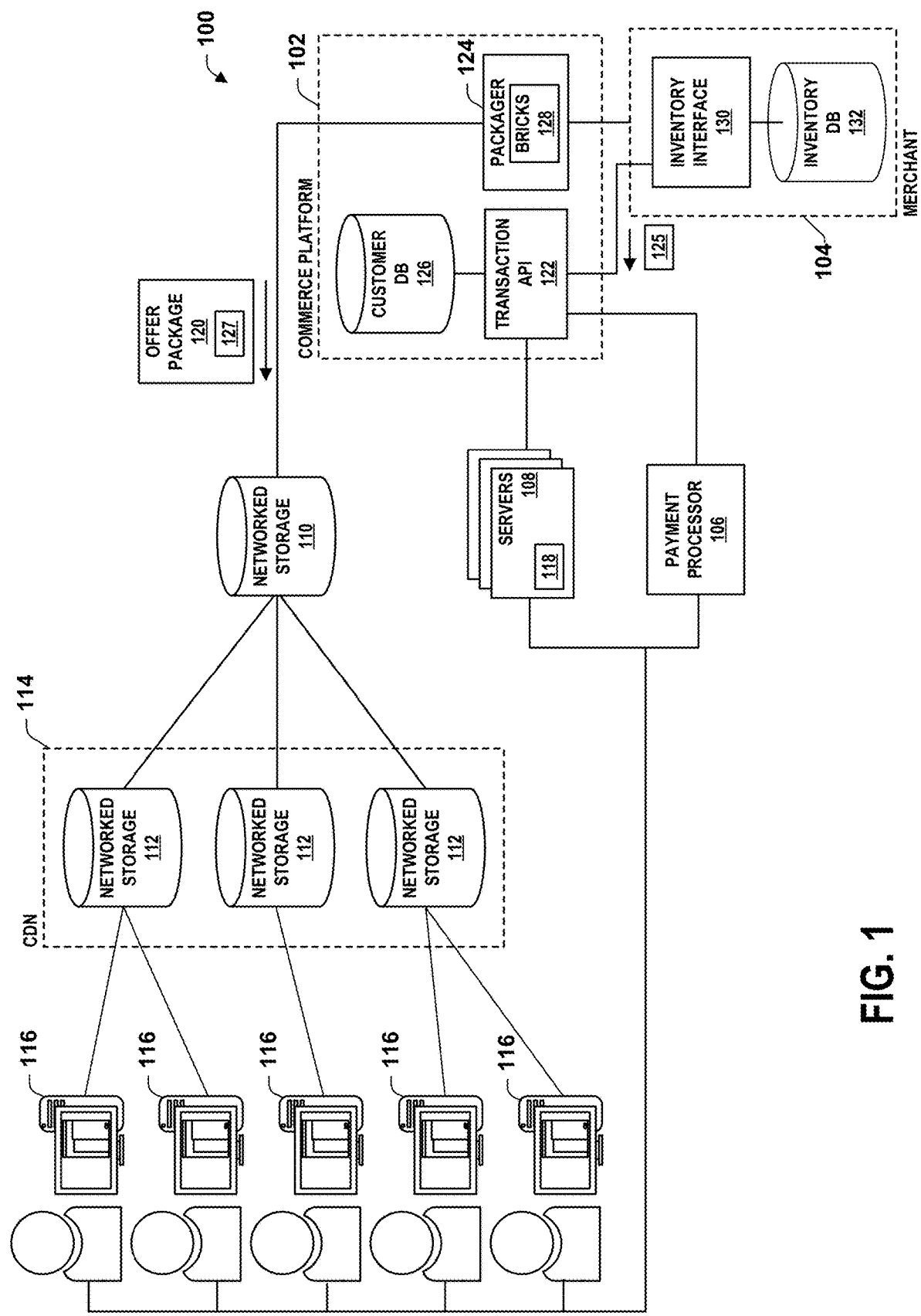
FIG. 1 is a block diagram of an example system to provide an electronic commerce platform to manage a surge network traffic, according to the teachings of this disclosure.

Reference will now be made in detail to exemplary embodiments of the present disclosure, examples of which are illustrated in the accompanying drawings. It is to be understood that other embodiments may be utilized, and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Commerce platforms that offer high demand and/or limited time offers for good and/or services often require backend systems (e.g., physical and/or virtual servers, databases, network bandwidth, etc.) that are deployed to meet or scale to surges in network traffic as a large number of customers simultaneously attempt to procure the goods and/or services. For example, platforms that handle ticket sales for major events (e.g., sports, concerts, etc.) often see such surges in network traffic as tickets are released. These surges can be orders of magnitude greater than the mean or ordinary network traffic and can overwhelm the commerce platform and its surrounding infrastructure with the flood of Internet traffic. Managing these sources can be costly and error prone, as it depends on recognizing the surge and differentiating the surge from illegitimate traffic (e.g., a denial of service attack, etc.). Additionally, in many cases, some backend systems, such as inventory management systems, are deployed using technology that is hard to scale (if even possible) and cannot handle the volume of requests necessary to service the traffic. For example, generally scalability must be part of the design of a database, and many inventory systems were deployed before scalability was required. This can lead to slowing, instability and/or termination of the operation of the ecommerce platform because the network and the backend system cannot cope or adapt quickly to the surge. Attempted techniques, such as queues and timed inventory reservation systems, etc., are often not effective in mitigating the effects of surges on the network traffic and can be used by malicious actors and/or undesirable consumers to deny some or all customers access to purchasing the good and/or services on the commerce platform. Accordingly, there are technical problems that prevent a commerce platform from being able to manage surges in network traffic volume without negatively affecting the backend systems that comprise the commerce platform.

As described herein, network traffic volume can inundate the platform. Without techniques to mitigate this surge of traffic, the platform may be degraded in its technical ability to operate and its servers may become overwhelmed. That is, the traffic surge may deny access to network resources, such as the servers running the platform. Managing inventory in the face of a surge of network traffic to a platform can be difficult. A secondary effect of a surge in legitimate traffic to the platform is an increase use of resources to manage the inventory. This is especially true when the underlying inventory management system (IMS) is implemented in older technology that was not designed for a massive number of near simultaneous queries. This flood of network traffic can cause the database of the IMS to become unresponsive. Additionally, when inventory is being accessed frequently, updating inventory status to users still browsing can create an additionally layer of network traffic. Some of this increased traffic is ultimately unnecessary if the user never becomes a customer. Accordingly, there is a need to have a method to maintain current information in cart interfaces while not generating more traffic directed at the commerce platform.

The term "server" has its ordinary meaning. Generally, a server provides computational services in a request—response model where, in response to a request (sometime referred to as a "call") over a network, the server performs some computational action and sends a response back to the requesting computer. As used herein, a "backend call" refers to a request by an interface operating on the computing device of a customer to a non-static network resource (e.g., a server, a database, etc.). A "backend call" generally requires the server(s) of the commerce platform to process the request and generate information to be sent to the requester that is responsive to the contents of the request. For example, the backend call may require a query into an inventory database to determine the status of inventory associated with the offer. Though the intensity can vary, backend calls are relatively computationally intensive to network resources. The terms "network storage" and "cloud storage" have their ordinary meaning. Generally, network storage provides object storage through a web service interface to facilitate remote storage and retrieval of data objects. As used herein, a "static call" refers to a request to a static network resource, such as networked storage that stores data objects (e.g., visual elements for an interface, scripts to be executed by the interface, offer packages, etc.). Static calls are relatively computationally inexpensive. As used herein, an "offer instantiator" refers to a document designed to be processed in a web browser that includes (i) structure (e.g., written in HTML code, etc.) necessary to render a cart interface, (ii) a location of where to receive a related offer package (e.g., from networked storage), and (iii) a location to receive a script to render the cart interface using the structure and the offer package.

A merchant that desires to make an offer via a surge traffic resistant commerce platform ("commerce platform") generates an offer package through the commerce platform. The offer package contains information necessary to render a cart interface and browse inventory associated with the offer without making backend calls to the commerce platform or any inventory management system tracking the inventory associated with the offer. The package may be, for example, generated in a data-interchange format. The package is then stored on one or more static network storage devices. To communicate the offer, the commerce platform creates a link (e.g., a Uniform Resource Locator (URL), etc.) that points to an address that contains the location of the offer package, the location of the script to render the cart interface, and a minimum amount of code (e.g., HTML, etc.) necessary to use the script to render the cart interface.

When a consumer activates the link, the consumer's browser fetches the offer package and the script to render the cart interface (e.g., by generating browser readable code, etc.) on the computing device executing the browser. That is, instead of a server (e.g., one of the servers of the commerce platform) generating the cart interface and then sending the browser readable code defining the cart interface to the browser, the computing device of the customer generates the browser readable code for the cart interface using the script and based on the offer package. In such a manner, when a surge of customers are simultaneously or near simultaneously interacting with the cart interface, a corresponding surge of traffic is not generated directed at the servers of the commerce platform and those servers are not overwhelmed by the resulting processing to generate and update the cart interface. The cart interface includes an action button. The browser generated cart interface performs pre-checkout cart management functions using the resources of the browser without making inventory or checkout related backend calls to the servers of the commerce platform until the action button is activated (e.g., "clicked on") by the customer.

These pre-checkout cart management functions include browsing inventory (e.g., names, descriptions, and/or prices of inventory available through the offer, etc.), receiving an indication of the type and/or quantity that the customer desires to purchase, and/or calculating an estimated total cost of the indicated type and quantity. Because the package includes all of the inventory information (e.g., offer details, identities and descriptions of inventory available with the offer, price, etc.), the cart interface performs these pre-checkout functions without making any backend calls. Thus, a surge of customers browsing inventory, many of whom are not likely to complete a purchase, does not create a corresponding surge in network traffic or server load for the commerce platform. From time-to-time, the commerce platform may asynchronously regenerate the offer package to change any part of the offer, including available inventory, the theme or template, etc., to replace the previous package at the same location in the static network storage. Thus, the merchant may dynamically update the cart interface without causes a surge of network traffic or server load.

When the customer activates the action button, the browser renders, based on the offer package, a checkout interface and makes a backend call that includes the identities and quantities of the inventory in the current cart of the cart interface. This backend call causes one of the servers to calculate the actual (e.g., non-estimated) cost, including the unit cost of each item and any associated fees, to the items in the cart and report that total to the checkout interface. The customer may change quantities (e.g., add quantities, subtract quantities, delete items, etc.) in the checkout interface. Each change results in the backend call to calculate the total cost of the items. These price calculations are performed without querying the inventory management system of the merchant. Thus, a large number of such backend calls does not result in an increased load on the merchant's inventory management system. In some examples, these backend calls are configured to be computationally light to reduce any strain on the servers of the commerce platform.

When the browser receives the calculation, the checkout interface displays the total. The checkout interface performs a redirect to a payment processor. In some examples, this causes the payment processor to instantiate one or more payment electronic widgets (e.g., a Google® Pay widget, an Apple® Pay widget, etc.) and/or a credit card payment widget in the checkout interface. Interacting with one of the electronic payment widgets or the credit card payment widget (e.g., providing payment credentials, etc.) causes the payment processor to generate a payment intent that places a hold on funds equal to the calculated amount. Up to this point, the merchant platform does not make any call to the inventory management system of the merchant. After the payment processor signals that the payment intent was successful, the commerce platform attempts to place a reserve on the items with the inventory management system of the merchant. When the inventory management system signals that the attempt to reserve the inventory was successful, the commerce platform initiates one or more authenticity/security checks (sometimes referred to as "authorization challenges") with the customer via the checkout interface. When all of the authenticity/security checks are successful, the commerce platform requests that the inventory management system places the reserved items be in a fulfillment status. The commerce platform then signals the payment processor to complete the transaction based on the purchase intent. The commerce platform then performs post-purchase fulfillment actions via the checkout interface. In such a manner, the commerce platform minimizes network traffic, server load, and load on the inventory management system by only generating such activity when the customer has affirmatively signaled their desire to complete a transaction and only to the extent necessary for their current level of commitment.

As described here, the available inventory for the browser by the cart interface is included in the offer package. When the user's computing device instantiates the cart interface based on the offer package, the cart interface includes the available inventory. Inventory updates are not provided directly by the commerce platform to the computing device. Rather, from time-to-time, the commerce platforms updated the available inventory and republished the offer package with the updated inventory. When the browser operating on the computing device refreshes, the offer instantiator causes the browser to retrieve the offer package with the updated inventory and re-instantiate the cart interface with the updated inventory. To network traffic, the commerce platform does not send a signal to or otherwise inform the computing device in response to regenerating and republishing the offer package. The browser may refresh when (i) the user manually refreshes it, (ii) the cart interface automatically refreshes at a configurable interval (e.g. every 30 seconds, every 60 seconds, etc.), and/or (iii) when the commerce platform signals that there is a mismatch between the currently available inventory as tracked by the commerce platform and the selections made by the user (e.g., in response to the user hitting the action button of the cart interface, etc.).

Additionally, to reduce processing resources and time required by the computing devices to instantiate the cart interface with the available inventory (e.g., after retrieving an updated offer package, etc.) (e.g., to reduce the time it takes from downloading the updated offer package to the updates being available to the user), the commerce platform performs preprocessing on the available inventory. The commerce platform performs filtering on the available inventory, based on the attributes of the available inventory, to the device of the available inventory into inventory slices (sometimes referred to as "variants"). This process is sometimes referred to herein as "slicing the inventory." Inventory slices represent categories of inventory items that may be combined to be presented to the user in the cart interface, with each inventory item in the inventory slice being fungible (e.g., a good or asset that is interchangeable with other individual goods or assets of the same type) or pseudo-fungible (e.g., a good or asset that is interchangeable with other individual goods or assets of a similar type, where the non-fungible attributes are ignored for the purposes of interchangeability). For example, supporter scarves of the same design may be fungible or hoodies of the same color, style, and size may be fungible. As another examples, tickets for the occupation of specific seats in a venue (a non-fungible item) may be considered pseudo-fungible with other seats in the same row and section or in the same section of the venue, as configurable by the commerce platform and/or the merchant. As another example of a pseudo-fungible item that may be sliced, a set of autographed cards may be limited edition and numbered, but the commerce platform may treat them as fungible items (e.g., the user does not have an opportunity to a select a particular autographed card).

For some goods and services, such as event tickets, customers tend to prefer a minimum quantity. For example, event tickets are often sold quantities of two or more. Stranded tickets are tickets that are less likely be to be sold because there are not a contiguous number of tickets available that meet or exceed this minimum number. For example, often unsold tickets that do not have at least one contiguous available ticket become stranded tickets. Because customers are independently selecting seats of varying quantities, seating often because fragmented as the number of stranded tickets increase. In some examples, to prevent stranded tickets, the commerce platform allocates a customer to specify a quantity and a desired attribute (such as a specific section within the venue, a specific price, etc.) of the event tickets and assigns the tickets to the customer based on an internal algorithm. Often, the assignment takes place after a large number of event tickets are sold and minimizes the number of stranded tickets. As example of algorithmically assigning tickets is described in U.S. patent application Ser. No. 16/902,165 entitled, "Systems and Methods of Group Electronic Commerce and Distribution of Items," filed Jun. 15, 2020, which is herein incorporated by reference in its entirety. As described below, the surge resistance commerce platform facilitates customers that purchase multiple event tickets to select specific seats from a curated set of continuous seats while not making backend calls that increase network traffic to the surge resistance commerce platform. The surge resistance commerce platform generates the inventory slices for the offer package that includes information identifying contiguous seats within the inventory slice. When a customer selects multiple event tickets via the cart interface instantiated by the browser using the offer package, the cart interface identifies groups of the quantity of seats that satisfy contiguity rules and presents the identified groups of seats to the customer. That is, the cart interface curates a list of seat selections that meet the quantity requirement set by the customer and contiguity rules that are set forth by the surge resistance commerce platform to prevent stranded tickets while allowing customers to select specific seats while still reducing strain on the servers of the commerce platform.

FIG. 1 is a block diagram of an example system 100 to provide an electronic commerce platform 102 to manage a surge network traffic. In the illustrated example, the commerce platform 102 is communicatively coupled merchant networks (e.g., merchant network 104) and payment processors 106. The commerce platform 102 is also communicatively coupled to one or more webservers 108 (e.g., physical servers, virtual servers, and/or virtualized containers, etc.) and one or more network storage devices 110 (e.g., Amazon® S3, Google® Cloud Storage, Azure® Blob Storage, IBM® Cloud Object Storage, etc.). Data objects stored in the network storage devices 110 may be pushed onto network storage devices 112 that are part of a content delivery network (CDN) 114 to be accessed by browsers operating on computing devices 116 (e.g., desktop computers, laptop computers, smart phones, tablets, smart televisions, etc.). The commerce platform 102 facilitates generation of offer instantiators 118 and offer packages 120 by a merchant to offer goods and/or services managed by the merchant network 104 through the commerce platform 102.

The commerce platform 102 includes a transaction application programming interface (API) 122, a packager 124, and a customer database 126. While in the illustrated example, the transaction API 122, the packager 124, the customer database 126, and the webservers 108 are illustrated as being conceptually grouped in a certain configuration for simplicity, these components may be otherwise situated in any suitable manner (e.g., on cloud servers, etc.). The transaction API 122 facilitates communication between the webservers 108, the payment processor 106, the merchant network 104, and the customer database 126. The packager 124 receives input from the merchant to generate the offer instantiator 118 and the offer package 120 using software bricks 128. In some examples, the package 124 generates the offer package 120 in a data-interchange format (e.g., JavaScript Object Notation (JSON), Extensible Markup Language (XML), YAML, etc.). The software bricks 128 are offer package components that define the parameters, metadata, available inventory and/or audiovisual assets of the offer and the interrelationship between these parameters, metadata, available inventory and/or audiovisual assets. The customer database 126 stores customer information to facilitate assigning an order from a checkout interface in a browser to a particular account or accounts for security and fulfillment purposes. The structure and organization of the offer package 120 are dictated by which bricks are used to generate the offer package 120.

Using the packager 124, the merchant defines the offer and provides an inventory data object 125 that specifies the available inventory for the offer and attributes of the inventory the merchant uses to distinguish the inventory. In some examples, the inventory data object 125 comprises a two dimensional table with a row for every good or service to be offered or class of goods or services to be offered (e.g., for non-fungible items) with one or more attributes related to the goods or services. For example, the data object may include a row for each seat in a venue that is to be part of the offer, and a column for the section number, a column for the row number, a column for the seat number, and a column for a classification of the seat (e.g., student seating, VIP seating, etc.). From time-to-time (periodically or aperiodically), the merchant may provide an updated inventory data object 125. For example, the packager 124 may request, at an interval no shorter than a refresh interval specified by the inventory management system of the merchant 104 (e.g., where the refresh interval is set to protect the integrity and operation of the IMS), an update to the inventory data object 125. The packager 124 generates a unique link (e.g., a URL link, etc.) that instructs a browser where to locate the offer instantiator 118. The offer package 120 contains the information necessary for the offer instantiator 118, when accessed by a browser, to render the cart interface and the checkout interface, including a description of the available inventory to facilitate a customer browsing the inventory through the cart interface without making any backend calls to the webservers 108 and/or the transaction API 122. As part of generating the offer package 120, the packager 124 pre-processes the inventory data object 125. The packager 124 slices the inventory data object 125 into inventory slices 127. The inventory slices 127 include inventory items with at least one similar attribute (e.g., general location within the venue, price, accessibility, etc.) such that the inventory slice 127 is an initial selector for the inventory items that the customer desires to purchase. In some examples, where the inventory items are tickets that represent specific seats in a venue, the attributes may be a level (e.g., orchestra level, mezzanine level, balcony level, etc.), a section (e.g., midfield, endline, supporter, visitor, corner, etc.), and/or a price (e.g., $20, $100, $500, etc.). The packager 124 includes information that identifies contiguous seats within the inventory slices 127. Additionally, the packager 124 includes continuity rules within the offer package 120 that identifies which inventory items are to be presented to the customer for selection based on a quantity of tickets entered into the cart interface by the customer. For example, the continuity rules may specify a stranding threshold and a number of sets of seat selections the cart interface is to provide to the customer. The stranding threshold is a number of seats that are considered stranded when there are no addition continuous seats available next to that number of seats. In some examples, the stranding threshold is one.

The inventory slices 127 are, as explained below, packaged into the offer package 120. After the offer instantiator 118 and offer package 120 are created, the packager 124 publishes the instantiator 118 onto the webservers 108 and pushed the offer package 118 onto the networked storage 110 and 112. The link to the instantiator 118 may then be provided to customers. In the illustrated example, the instantiator 118 is located on a server and is accessible via a domain that is controlled/operated by the commerce platform 102. Alternatively, in some examples, the instantiator 118 may be located on a server and accessible via a domain that is controlled/operated by another party (e.g., the merchant network 104, a third party, etc.).

The offer package 120 may be regenerated from time-to-time with new and/or updated parameters, metadata, available inventory and/or audiovisual assets of the offer. For example, the offer packager 124 may regenerate the offer package 120 periodically, in response to a change in the parameters and/or metadata associated with any bricks 128 used to generate the offer package 128, and/or in response to receiving or otherwise retrieving an updated inventory data object 125. When the offer package 120 is rebuilt, the packager 124 pushes the updated offer package to replace the old offer package in the networked storage 110 and 112. In such a manner, the merchant can dynamically and asynchronously update the offer package 130 while customers access the offer instantiator 118 without interruption.

The example merchant network 104 includes an inventory interface 130 and an inventory database 132 (collectively may be referred to as an "inventory management system" or "IMS"). The inventory from which the inventory data object 125 is compiled is stored in the inventory database 132. The inventory interface 130, using the inventory database 132, provides the inventory data object 125. The inventory interface 130 may also manipulate the inventory in the inventory database 132 by, for example, changing the status of the inventory (e.g., reserving the inventory, marking the inventory for fulfillment, etc.). In some examples, because too frequent compilations of inventory may cause the degradation or loss of operation of the IMS (e.g., the inventory database 132) and/or may interfere with ability of the IMS to change the status of the inventory as purchases are made, the inventory interface 130 may set a refresh interval limit the frequency at which the packager 124 may request a refresh of the inventory data object 125.

When a consumer activates the link to the offer instantiator 118, the consumer's browser performs a static call to retrieve the offer package 120 and the script to render the cart interface (e.g., by generating browser readable code, etc.) from the network storage 110 and 112. The browser then renders the cart interface by executing the script using the offer package 120, including populating the available inventory in the cart interface based on the inventory slices 127. This available inventory does not change through direct updates or making a backend call for the update. The browser generated cart interface performs pre-checkout cart management functions using the resources of the browser. These pre-checkout cart management functions include browsing inventory (e.g., names, descriptions, and/or prices of inventory available through the offer, etc.) as defined by the inventory data object (e.g., as processed by the bricks 128).

From time-to-time, the browser may refresh access to the offer instantiator 118. For example, the user may refresh the browser or the browser may receive a signal to refresh access to the offer instantiator in response to making a backend call. Then the browser refreshes access to the offer instantiator 118, the browser performs a static call to retrieve the offer package 120 and the script to render the cart interface from the network storage 110 and 112. If the offer package 120 has been updated since the last time the offer package 120 was retrieved, the offer instantiator will cause the browser to retrieve the updated offer package 120. The browser then renders the cart interface by executing the script using the updated offer package 120, including any updated inventory slices 127.

When the customer activates the action button, the browser renders, based on the offer package 120, a checkout interface and makes a backend call that includes the identifiers (sometimes referred to as "inventory unit identifiers") that identify inventory in the current cart of the cart interface and quantities of the inventory in the current cart of the cart interface. This backend call causes one of the servers 108 to calculate the actual (e.g., non-estimated) cost, including the unit cost of each item and any associated fees, to the items in the cart and report that total to the checkout interface. The customer may change quantities (e.g., add quantities, subtract quantities, delete items, etc.) in the checkout interface. Each changes results in the backend call to the servers 108 to calculate the total cost of the items.

When the browser receives the calculation, the checkout interface displays the total. The checkout interface performs a redirect to the payment processor 106. In some examples, this causes the payment processor 106 to instantiate one or more payment electronic widgets (e.g., a Google® Pay widget, an Apple® Pay widget, etc.) and/or a credit card payment widget in the checkout interface. Successfully credentialing through one of the electronic payment widgets or the credit card payment widget causes the payment processor 106 to generate a payment intent that places a hold on funds equal to the calculated amount. After the payment processor 106 signals that the payment intent was successful, the transaction API 122 attempts to place a reserve on the items with the inventory management system. When the inventory management system signals that the attempt to reserve the inventory was successful, the transaction API 122 initiates one or more authenticity/security checks with the customer via the checkout interface. When all of the authenticity/security checks are successful, the transaction API 122 requests that the inventory management system place the reserved items in a fulfillment status. The transaction API 122 then signals the payment processor 106 to complete the transaction based on the purchase intent. The transaction API 122 then performs post-purchase fulfillment actions via the checkout interface.

Figure 2:
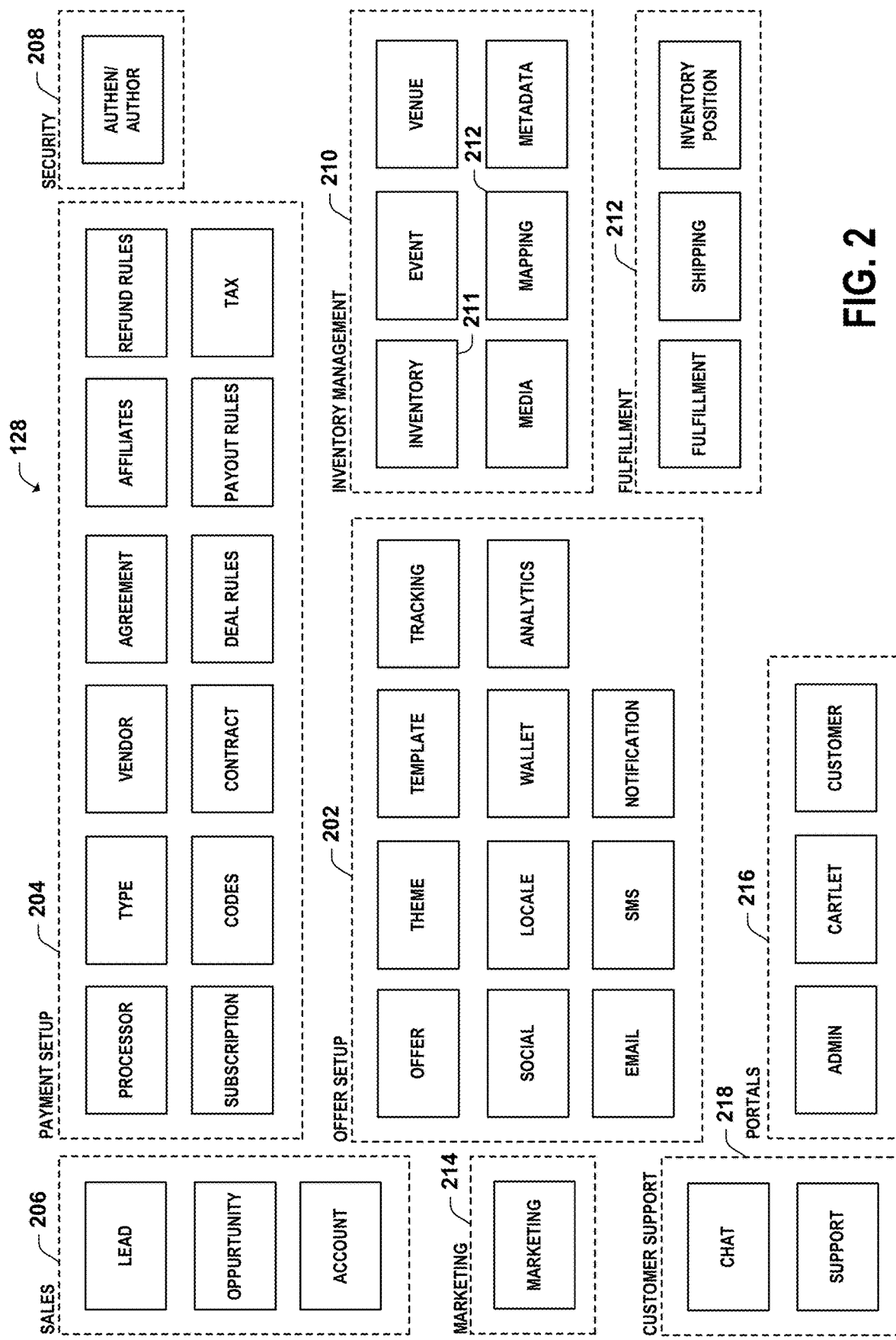
FIG. 2 is a conceptual diagram of bricks used to construct a package used to manage the surge network traffic, according to the teachings of this disclosure.

FIG. 2 illustrates examples of the bricks 128 used to define and construct the offer package 120. The bricks 128 are software structures that define the parameters, metadata, available inventory and/or audiovisual assets of the offer, the interrelationship between these parameters, metadata, available inventory and/or audiovisual assets, and the syntax of the data interchange format in which the package 120 is being created. The bricks 128 may have different versions representing different structures that may be selected depending on the desired structure of the offer package. When creating the offer package 120, the merchant may select the relevant bricks 128 to define the look and feel, the functionality, inventory management and grouping, and the order flow associated with the cart interface that is rendered using the offer package 120 constructed using the bricks 128 selected and populated by the merchant. The bricks 128 facilitate building the offer package 120 so to include the necessary parameters, metadata, available inventory and/or audiovisual assets of the offer and/or tokens point to the parameters and/or metadata to perform front end actions (e.g., the computing device 116 rendering the cart interface for the offer) and to perform backend actions (e.g., handle payment, refunds, fund allocation, customer service, etc.). In the illustrated example, the bricks 128 are arranged in thematic groups. However, the bricks 128 may be arranged in any manner. For example, when the packager 124 packages the selected bricks 128, into the offer package 120, the resulting structure of the offer package 120 mirrors the bricks 128. In some examples, the bricks 128 define interface elements that translate the structure of the bricks into interactable objects within an interface to design an offer. The interactable objects have inputs that facilitate receiving the information necessary to render the component of, for example, the cart interface and define relationships between the bricks 128. As such, as bricks 128 are added to an offer, a corresponding interface in an offer editor is generated.

In the illustrated example of FIG. 2, a group of bricks 128 is classified in an offer setup group 202. The bricks 128 in the offer setup group 202 are used to build the look and feel of the cart interface as well as the operation of the cart interface related to the specific offer. A group of bricks 128 is classified in a payment setup group 204. The bricks 128 in the payment setup group 204 are used to define rules for a transaction made of the specific offer and establish a transactional route and history for every good and/or service purchased through the offer. A group of bricks 128 is classified in a sale group 206. The bricks 128 in the sales group 206 interface with external customer management providers to connect offers to the merchant and facilitate merchant account management. The offer setup group 202, the payment setup group 204, and the sales group 206 contribute structure and metadata to the offer package 120 to facilitate forensically tracing and justifying any transaction that is made according to the offer package 120 and to supply a system with information to complete a transaction while minimizing the transaction's use of backend calls.

In the illustrated example, a group of bricks 128 is classified in a security group 208. Bricks 128 in the security group 208 provide parameters and metadata for performing the multiple security checks to authenticate a customer and check if the customer is authorized to perform the transaction. A group of bricks 128 is classified in an inventory management group 210. Bricks 128 in the inventory management group 210 provide parameters and metadata for slicing and presenting inventory in the cart interface and interfacing with the inventory management system of the merchant. An inventory brick 211 provides a connector between the packager 124 and the IMS of the merchant 104 (sometimes referred to as an "adapter"). The inventory brick 211 includes, for example, specific API calls and limitations and/or parameters for those calls for the specific IMS of the merchant 104. In some examples, the packager 124 may include multiple inventory bricks 211 when multiple merchants 104 and/or multiple IMSs are involved in the offer. The inventory brick 211 retrieves or otherwise receives the inventory data object 125 from the IMS of the merchant 124. One of the parameters of the inventory brick 211, for example, may be the refresh interval specified by the IMS of the merchant 104 to limit the frequency the packager 124 may request the inventory data object 125. A mapping brick 212 receives the inventory data object 125 and facilitates the merchant 104 and/or the commerce platform 102 into slicing the inventory data object 125 into the inventory slices 127 to be included in the offer package 120 such that (a) the corresponding inventory is arranged/organized in the cart and/or checkout interface and (b) the inventory has an appropriate quantity picker assigned in the cart and/or checkout interface, etc. In some examples, the mapping brick 212 also specifies the contiguity threshold and the number of sets of seats to offer to the customer. A group of bricks 128 is classified in a fulfillment group 213. Bricks 128 in the fulfillment group 128 provide parameters and metadata for fulfilling and delivering inventory after a successful transaction. A group of bricks 128 is classified in a marketing group 214 to provide support to attributing sales of goods and/services to parties involved in completing the transaction (e.g., first party or third party sales agents, etc.). A group of bricks 128 is classified in a portals group 216. Bricks 128 in the portals group 216 provide top level structure to packages, including the offer package 120. A group of bricks 128 is classified in a customer support group 218 that includes structure, parameters, and metadata to render a customer support interface and to process customer support requests while minimizing the number of backend calls the customer's browser performs.

Figure 3:
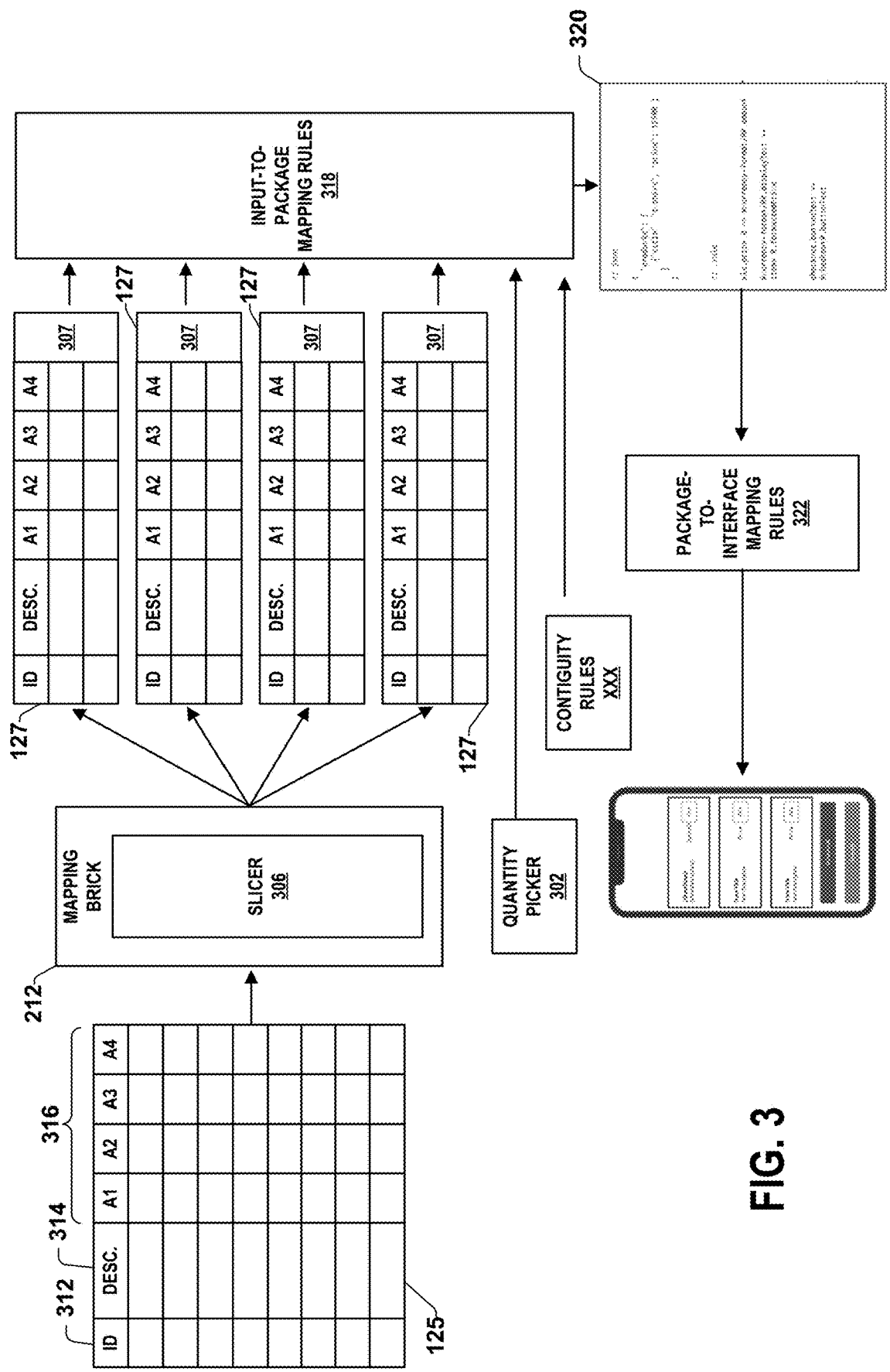
FIG. 3 is a conceptual diagram of the packager of FIG. 1 generating an offer package, according to the teachings of this disclosure.

FIG. 3 is a conceptual diagram of the packager 124 of FIG. 1 generating the offer package 120. The packager 124 uses a plurality of bricks 128 to define the content of the offer package 120 and the structure of the offer package 124 that will be used to instantiate the cart and checkout interfaces using the resources of the computing devices 116 of the user accessing the corresponding offer instantiator 118. The merchant 102 interaction with the packager 124 through a packager interface that facilitates editing of the contents and structure of the offer package 120. The packager interface includes selectors to facilitate selection of which bricks 128 (e.g., and which subbricks, etc.) to use to generate the offer package 120 and edit the parameters and metadata associated with each of the selected bricks 128. These selectors may be graphical elements that are dragged and moved in the packager interface to select the bricks 128 and to define relationships between the bricks 128. For example, the bricks 128 may specify different widgets, different quantity pickers 302, different themes, different templates, define audio and/or visual assets to be used, and/or different ways to slice inventory, etc. (collectively referred to as "elements"). For example, the widgets define interactive interface elements in the cart interface that causes the hosting browser to perform an action that reaches externally from the browser (e.g., make a backend call, make a call to the payment processor 106, etc.). For example, one widget may define the parameters (e.g., size, shape, position, label, etc.) of the action button. As another example, one widget may define which third party payment processor to send information to facilitate instantiation of the payment processor's payment interface in the checkout interface.

In the illustrated example of FIG. 3, the mapping brick 212 includes a slicer 306. The slicer 306 facilitates transforming the inventory data object 125 of the inventory to be included in the offer package 120 into slices of inventory 127 that have common attributes and are to be organized in the cart interface together with and each associated with a quantity picker 302. The slicer 306 also determines sets of continuous seats within each inventory slice 127 and generate group seating data 307 to include in the inventory slice 127. The group seating data 307 specifies sets of contiguous seats within the inventory slice by, for example, specifying which rows within the inventory slice 127 represent each set of continuous seats and how many continuous seats exist in each set. For example, the group seating data 307 may specify that rows one through four of the inventory slice 127 represent a set of continuous seats and that a set of continuous seats includes four seats. The inventory slices 127 may further be subdivided by the slicer 306 to form a hieratical set of sliced inventory, for example in a tree structure, where the bottom slices are assigned a quantity picker 302. In such an example, the group seating data 307 may pertain to the rows in the bottom slices.

The inventory data object 125 includes a unique identifier 312 for each inventory item or class of inventory item. For example, fungible items and/or services (e.g., such as clothing, consumables, etc.) may have an identifier that is associated with all items of the class (e.g., all shirts of the same cut, color, and size may have the same identifier, etc.), while pseudo-fungible and/or limited edition goods or services have unique identifiers. The inventory data object 125 includes a description 314 that provides a human-readable description of the goods and/or services. The inventory data object 125 includes attributes 316 that distinguish the goods in some way (e.g., descriptively (such as color, location, quality, etc.) and/or organizationally (such as discounts, relations, intangible quantifier, etc.). For example, the attributes may include a price, a group identifier, a color, a size, shape, one or more location related attributes, etc. The slicer 306 transforms the inventory data object 125 into the slices of inventory 127 based on the attributes 316 as designated via the mapping brick 212 by the merchant.

In the illustrated example of FIG. 3, the packager 124 includes input-to-package mapping rules 318 that transform the widgets (e.g., the quantity picker(s) 302), other elements (e.g., themes, templates, and/or audio and/or visual assets to be used, etc.), and, in the illustrated example, the inventory slices 127 into a data interchange formatted file 320 for the offer package 120. The mapping rules 308 map the sliced inventory 127 to quantity pickers 302, and other information defined by and through the bricks 128 (e.g., the widgets 304 and the elements 306, etc.), and translate the mapped sliced inventory 127 into syntax of the data interchange format such that all of the data required to build the cart interface and the checkout interface, all of the data to perform cart management functions (e.g., displaying inventory being offered, prices, and descriptions; manipulating quantities in the cart; estimating total price, etc.) are included in the offer package 120. The mapping rules 318 also map contiguity rules 319 into the data interchange formatted file 320. The contiguity rules 319 set a framework for how the cart interface is to provide sets of contiguous seats from which the customer can select through the cart interface. The contiguity rules 319 specify a contiguity threshold and a maximum number of sets of contiguous seats the cart interface is to provide for selection.

In the illustrated example, the data interchange formatted file 320 is a process with package-to-interface rules 322 that specify how the elements will be graphically laid out by the cart interface and/or checkout interface based on, for example, the selected theme and template bricks and the target browser in which the interfaces will be created. For example, the package-to-interface rules 322 may define how the inventory slices 127 and the associated quantity pickers 302 are laid out on the available screen of the target browser taking into account space and processing limitations inherent in some computing devices, such as mobile devices. In some examples, the data interchange formatted file 320 may be processed by different sets for package-to-interface rules 322 to generate different versions of the offer package 120, where the offer initiator 120 causes the browser to download one of the versions of the offer package 120 based on the qualities of the browser. For example, a set of package-to-interface rules 320 may generate one offer package 120 for browsers operating on mobile devices (e.g., smart phones, smart watches, etc.), one offer package 120 for browsers operating on computing devices (e.g., desktop computers, tablets, laptop computers, etc.), and one offer package for browsers operating on mixed reality devices (e.g., virtual reality headsets, augmented reality headsets, etc.). That is, the package-to-interface rules 322 are configured to take into account limitations that are inherent in the computing device 116 that is operating the browser, such as limited screen area, existence of a touchscreen, processing power, and/or network bandwidth availability, etc. Because the input-to-package rules 318 are processed separately from the package-to-interface mapping rules 322, the rules sets 318 and 322 can be updated asynchronously. That is, the template bricks may be updated, and the update will be implemented the next time the offer package 120 is published.

Figure 4:
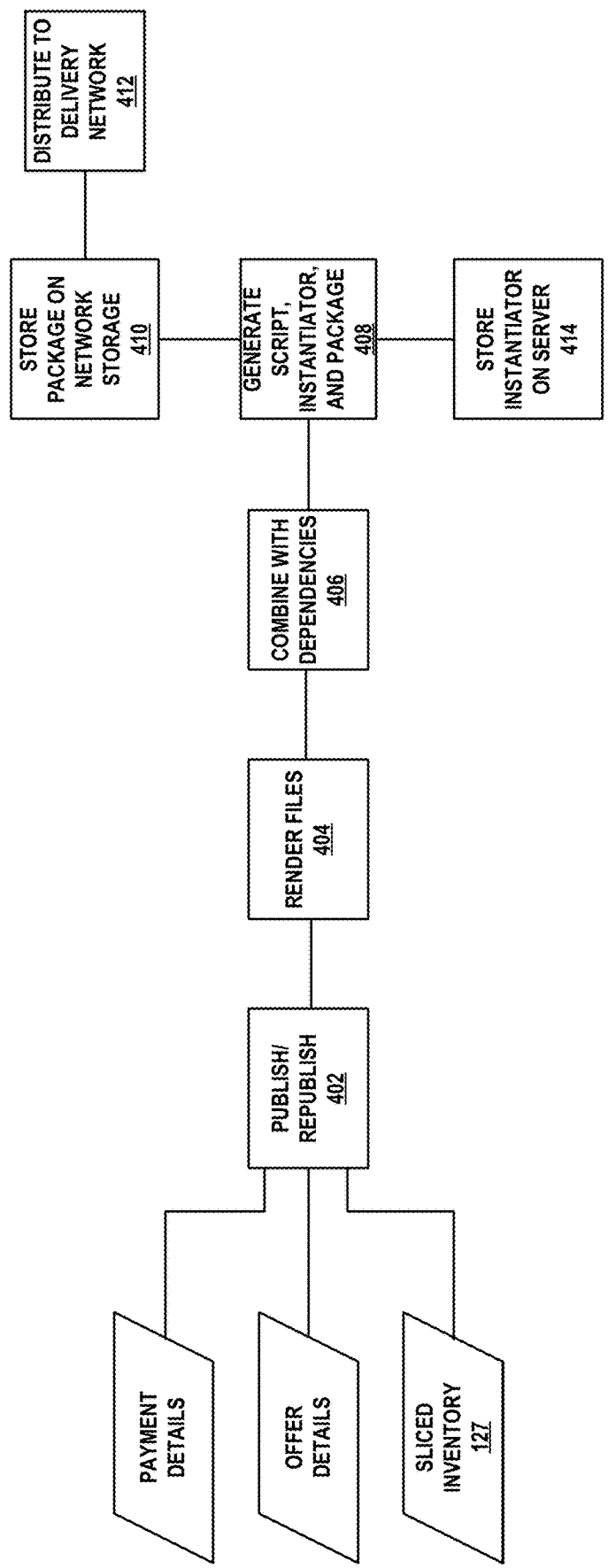
FIG. 4 is a conceptual diagram of the commerce platform of FIG. 1 publishing the offer package, according to the teachings of this disclosure.

FIG. 4 is a conceptual diagram of the commerce platform 102 of FIG. 1 publishing the offer package 120 and the offer instantiator 118. The commerce platform 102 may asynchronously publish a republish of the offer instantiator 118 and the offer package 120 without regard to computing devices 116 instantiating the cart and/or checkout interface. At block 402, the entity using the commerce platform 102 (e.g., the merchant 104, etc.) indicates that the offer instantiator 118 and/or the offer package 120 should be published or republished. For example, a "publish" button may be provided in the packager interface. To start the process of publishing the offer instantiator 118 and the offer package 120, the packager 124 pulls in the template, the theme, the relevant metadata and parameters from the bricks and, in the illustrated example, the inventory slices 127. At block 404, the packager 124 renders the offer package 120. In some examples, the packager 124 renders the offer package 120 in accordance to the process described in connection with FIG. 3 above. The packager 124 may perform this rendering multiple times to generate offer packages 120 to be used by different browsers. At block 406, the packager 124 retrieves dependencies that are specified by the bricks 128 used to create the offer package 120. The dependencies may be, for example, libraries, audio and/or visual files (e.g., as designated by the selected template brick, the selected theme brick, and/or the selected quantity picker brick, etc.), and/or link paths (e.g., URLs, etc.), etc. Because bricks 128 can be updated asynchronously, decencies that may have changed since the last time the offer package 120 was published automatically have those dependencies updated in an offer package when it is republished. At block 408, the packager 124 generates the offer package(s) 120, the script used by the browser to generate the cart and checkout interfaces, and the offer instantiator 118 to be distributed. In some examples, the packager 124 may perform versioning of the offer package(s) 120 and the script each time the offer package(s) is/are republished. The offer instantiator 118 may be changed to point the browser to the updated script and/or updated offer package(s) 120 when the browser refreshes. At block 410, the packager 124 stores the script, the offer package(s) 120, and/or any assets necessary to render the cart interfaces to the network storage 110. To prevent network traffic, especially to a large number of applicable computing devices 116, the packager 124 does not notify any of the computing devices 116 operating browsers in which the cart and/or checkout interface is instantiated that the offer package 120 is being published/republished. At block 412, the package 124 causes the script, the offer package(s) 120, and/or the assets to be distributed to the networked storage 112 in the CDN 114. In some examples, the packager 124 sends a signal to the CDN 114 invalidating the current cache, which causes the network storage 112 in the CDN 114 to update to the latest files. At block 414, the offer instantiator 118 is moved to the server(s) 108 to be accessed by the computing devices 116.

Figure 5A:
Figure 5B:
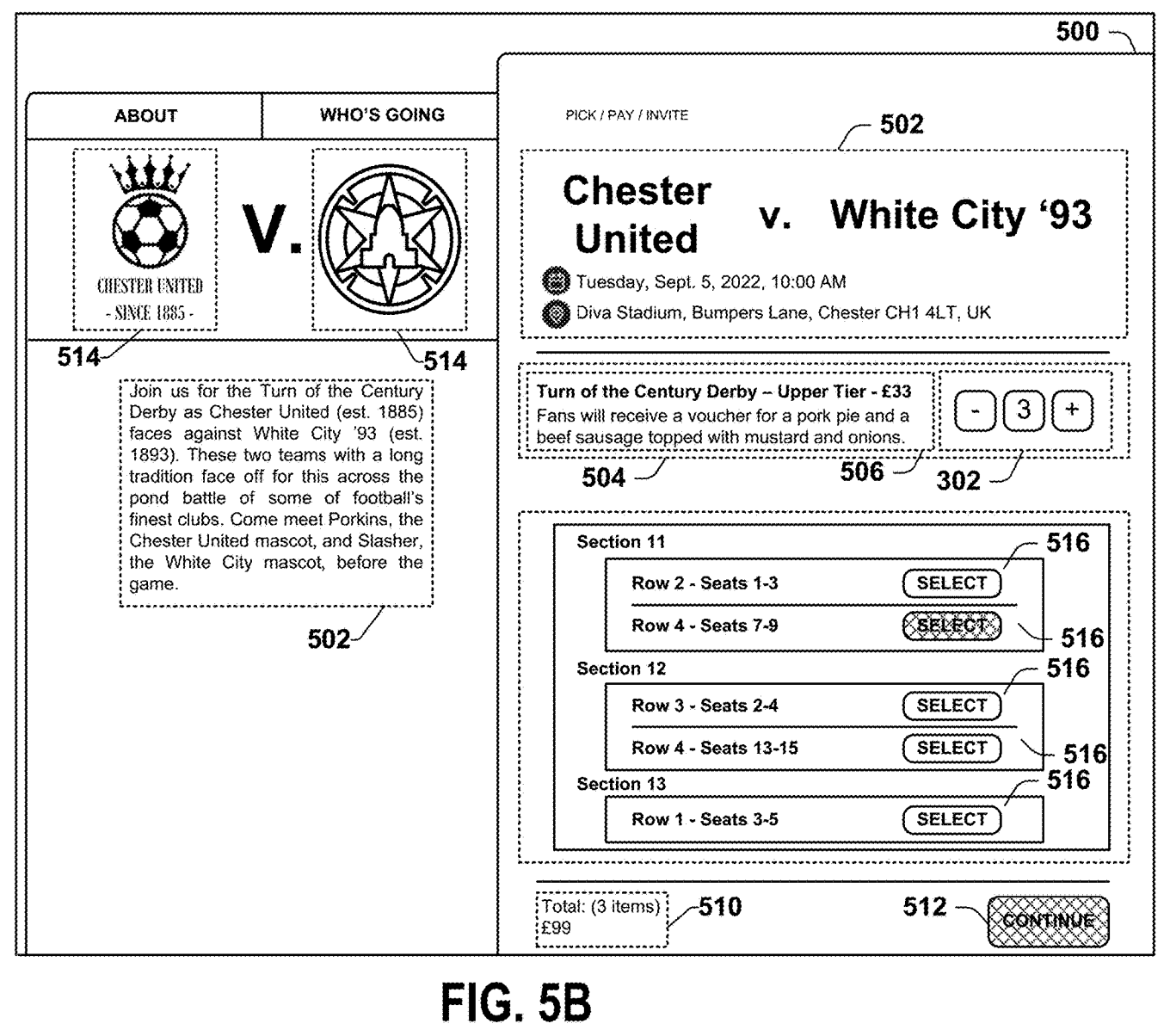

FIGS. 5A and 5B illustrate example cart interface 500 generated by a browser operating on a computer device 116 in response to being directed to the offer instantiator 118 based on the instantiating script and the offer package 120. In the illustrated example of FIG. 5A, the offer instantiator 118 causes the browser to fetch the instantiating script and offer package 120 to instantiate the cart interfaces 500 to select a quantity of items. In the illustrated example of FIG. 5B, the cart interfaces 500 provides for a selection of specific items from one or more sets of contiguous seats based on the contiguity rules 319 included in the offer package 120. The elements 502, 504, 506, 510, 512, and 514 of the cart interface 500 are rearranged and contextualized, by the script and/or the contents of the offer package 120 to use the browser resources available (such as screen space, input method, processing power, bandwidth availability, etc.). For example, the elements 502, 504, 506, 510, 512, and 514 of the cart interface 500 may be differently arranged on a browser operating on a desktop computer compared to the elements 502, 504, 506, 510, 512, and 514 of the cart interface 500 on a browser operating on a mobile device to present the same information in a manner that takes into account the limited space on which to display an interface on, for example, the mobile device. Once the offer package 120 is loaded in a browser, the instantiating script generates the code and makes the necessary calls to instantiate the cart interface 500 and perform cart management functions without making a backend call. From time-to-time, the commerce platform 102 may asynchronously update the offer package 120 and/or the instantiating script. In response to regenerating the offer package 120 and/or the instantiating script, the commerce platform 102 does not generate a signal to the browser to instruct the browser to refresh. The browser updates the cart interface 500 in response to an event that causes the browser to re-fetch the offer package 120 and/or the script (e.g., the user instructing the browser to refresh, the commerce platform 102 sending a refresh instruction in response to the user's actions, etc.).

As described in FIGS. 3 and 4 above, the office package 120 includes the inventory slices 127 in the offer package 127 and structures the inventory slices 127 such that the elements of the inventory data objects 125 have corresponding elements 302, 504, and 506 in the cart interface 500. In the illustrated examples, the cart interface 500 includes a high level description 502 of the inventory and an inventory item 504 for each inventory slice 127 in the offer package 127 The high level description 502 provide details that are generally applicable to all of the inventory items 504 (e.g., a title for the offer, a date, time and/or location relevant to the offer, etc.). In the illustrated example, each of the inventory items 504 corresponds to one of the inventory slices 127. While for illustrative purposes only a limited number of inventory items 504 are shown, the cart interface 500 may include as many inventory items 504 as the inventory slices 127 that are defined in the offer package 120. The inventory item 504 includes a description 506 of the inventory being offered corresponding to the description 314 and/or the attributes 316 from the inventory data object 125.

In the illustrated example, the inventory slices 127 define a set of pseudo-fungible goods that, for the purposes of the cart interface 500, are initially interchangeable. In the illustrated example of FIG. 5A, the cart interface 500 presents inventory slices 127 as one set of inventory to select from. In FIG. 5B, the cart interface 500 selects and presents one or more sets of grouped items (e.g., event tickets, etc.), as available according to the contiguity rules 319, from within the selected inventory slice 127. The example inventory slices 127 include multiple rows from the inventory data object 125 (sometimes referred to a "pool of inventory"), each row representing a unique good or service (e.g., a ticket for a particular seat in a venue, a particular non-fungible token, a particular limited edition item, etc.) that has one or more attributes 316 in common (such as, price, region of the venue, target consumer, etc.). As such, each inventory item 504 represents one of these pools of inventory. As the offer package 120 is updated with changes to the inventory slices 127, the script may cause the browser to instantiate more or fewer inventory objects 504 based on the updated inventory slices 127 in the updated offer package 120.

Each of the inventory items 504 is associated with a quantity picker 302 as defined in the offer package 120. When the quantity of items in the quantity picker 302 is changed, the browser, without making a backend call, estimates the total amount based on the information in the offer package 120 and displays the estimated total in a total field 510. Because this calculation is done entirely within the browser: (a) the calculation is quick, and (b) the manipulating of the inventory in the cart interface 500 does not result in traffic being directed to the commerce platform 102 and does not result in any queries into the IMS of the merchant 104. Using the script 121, based on the offer package 120, this cart management is repeated until the customer interacts with the action button 512. In this manner, the customer may browse the inventory items 504 and add items to the cart without any traffic being directed at the commerce platform 102. As illustrated in FIG. 5B, when a quantity is selected on the quantity picker 302, the browser issues the script and offer package 120, without making a backend call, selects and presents one or more sets of items 516 if those sets 516 are available according to the contiguity rules 319. The sets of times include the quantity of items specified by the quantity picker 302. As the customer changes the quantity in the quantity picker 302, the browser changes the sets 516. For example, if the customer selects three items via the quantity picker 302, the browser selects a number of sets 516 within the associated inventory slice 127 (e.g., a number specified by the contiguity rules 319) that satisfy the continuity threshold specified in the contiguity rules 319 using the group seating data 307. In such an example, the browser may provide five sets 516 for the customer to select from, even when there are more sets 516 within the inventory slice 127 (e.g., according to the group seating data 307) that satisfy the continuity threshold. In some examples, the cart interface 500 may also display a venue map with the seats corresponding to the selected sets 519 highlighted to aid selection of the set 516 the customer desires to purchase.

The look and feel of the cart interface 500 is dictated by the selected template brick and the selected theme brick. The template brick dictates how the script 121, in conjunction with the offer package 120, generates code to define the layout of elements 502, 504, 506, 302, 510, 512, and 514 within the cart interface 500. If, during block 402 of FIG. 4, the merchant were to select a different template brick or the template brick definition changed (e.g., changes that would take effect in block 406 of FIG. 4), when the customer refreshes the browser, the script 121, in conjunction with the offer package 120, would generate a changed layout. The selected theme brick dictates the aesthetic look and feel (e.g., color, audio visual assets 512, etc.). If, during block 402 of FIG. 4, the merchant were to select a different theme brick or the theme brick definition changed (e.g., changes that would take effect in block 406 of FIG. 4), when the customer refreshes the browser, the script 121, in conjunction with the offer package 120, would generate a different look and feel of the cart interface 500.

The cart interface 500 is different from the checkout interface. The cart interface 500 does not, until the action button 512 is interacted with, provide a method for the browser, during the course of the user browsing the inventory, to perform backend calls. Thus, in the cart interface 500, selecting and deselecting inventory (e.g., via the quantity picker 302) does not result in network traffic directed towards the commerce platform 102. Additionally, in some examples, actually purchasing the selected inventory cannot be accomplished through the cart interface 500 (e.g., purchasing is gated by proceeding to the checkout interface, etc.) As a result, a large number of users can simultaneously interact with a cart interface 500 instantiated entirely in their own browser without causing any network traffic to be directed towards the commerce platform 102. The checkout interface facilitates the browser receiving a calculation of actual cost of the selected inventory (via low processing-load backend calls to the commerce platform 102) and initiating purchase of the inventory (via interaction with a checkout button). Until an actual purchase of inventory is initiated (e.g., the user interacting with the checkout button), the checkout interface does not cause any queries into the IMS database 132.

Figure 6:
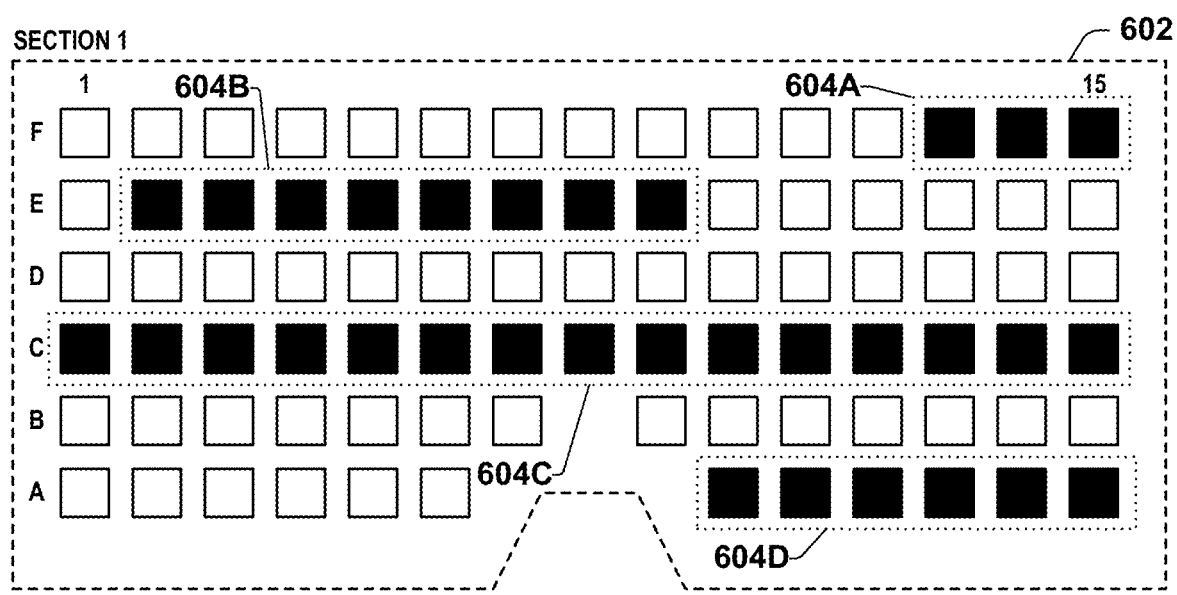
FIG. 6 illustrates an example of seats within a venue that the network traffic surge resistant platform apply group seating to, according to the teachings of this disclosure

FIG. 6 illustrates a visual example of seats within a venue associated with an example inventory slice 127. In the illustrated example, the inventory slice 127 represents seats that are available in a section 602 of the venue. Within the inventory slice 127, the group seating data 307 specifies contiguous sets of seats 604A-604D. In the illustrated example, contiguous seats are specified as seats that are next to, in the same row, at least one other seat in the set. In some examples, contiguous seats are specified as seats that are next to, in the same row or column, at least one other seat in the set. In some examples, contiguous seats are specified as seats that are next to at least one other seat in the set when (i) they are in the same row and (ii) they are in the same column as long as there is no row with only one seat. In some examples, the type of contiguity is specified in the contiguity rules 319.

The contiguity rules 319 provide the contiguity threshold. A set 516 is provided from contiguous sets of seats 604A-604D when the number of seats in the contiguous set of seats 604A-604D minus the quantity desired (sometimes referred to as the "number of remainder seats") is (i) greater than the contiguity threshold or (ii) equal to zero. If the number of remainder seats satisfies these conditions, seats within the contiguous set of seats 604A-604D are available to be provided as sets of seats 516. The browser selects which seats within the contiguous set of seats 604A-604D to select as the set of seats 516, based on seat prioritization rules within the contiguity rules 319. The seat prioritization rules may include, for example, (i) seats within the set of seats 604A-604D that at least include an aisle seat (e.g., seats 1 and 15 in the illustrated example), (ii) contiguous seats within the set of seats 604A-604D that at include the lowest seat within the set of seats 604A-604D, and/or (iii) contiguous seats within the set of seats 604A-604D that at include the highest seat within the set of seats 604A-604D, etc. In some examples, the browser may select only one set 516 from each available set of seats 604A-604D. When the contiguity rules 319 specify a maximum number of sets 516 to present via the cart interface 500, the contiguity rules 319 may specify set prioritization rules. For example, a set prioritization rule may set forth that the first sets 516 located by the browser are to be provided in the cart interface 500. As another example, a set prioritization rule may set forth that sets 516, where the corresponding number of remainder seats is zero, are to be prioritized in the sets 516 before other potential sets are included. As another example, a set prioritization rule may set forth that sets 516, where the corresponding number of remainder seats is an odd number, are to be deprioritized sets 516.

As a first example using the example illustrated in FIG. 6, if the quantity picker 302 for the inventory slice 127 that includes tickets for seats in section 1 of a venue indicates that the customer wants to purchase two tickets and the contiguity threshold is one, the browser determines that (i) the first set of seats 604A is not a valid set of seats because the number of remainder seats equals one, (ii) the second set of seats 604B is a valid set of seats because the number of remainder seats equals six, (iii) the third set of seats 604C is a valid set of seats because the number of remainder seats equals thirteen, and (iv) the fourth set of seats 604D is a valid set of seats because the number of remainder seats equals four. As a second example, using the example illustrated in FIG. 6, if the quantity picker 302 for the inventory slice 127 that includes tickets for seats in section 1 of a venue indicates that the customer wants to purchase three tickets and the contiguity threshold is one, the browser determines that (i) the first set of seats 604A is a valid set of seats because the number of remainder seats equals zero, (ii) the second set of seats 604B is a valid set of seats because the number of remainder seats equals five, (iii) the third set of seats 604C is a valid set of seats because the number of remainder seats equals twelve, and (iv) the fourth set of seats 604D is a valid set of seats because the number of remainder seats equals three. As a third example, using the example illustrated in FIG. 6, if the quantity picker 302 for the inventory slice 127 includes tickets for seats in section 1 of a venue and indicates that the customer wants to purchase five tickets and the contiguity threshold is one, the browser determines that (i) the first set of seats 604A is not a valid set of seats because the number of seats is less than the number of desired seats, (ii) the second set of seats 604B is a valid set of seats because the number of remainder seats equals three, (iii) the third set of seats 604C is a valid set of seats because the number of remainder seats equals ten, and (iv) the fourth set of seats 604D is not a valid set of seats because the number of remainder seats equals one.

Figure 7:
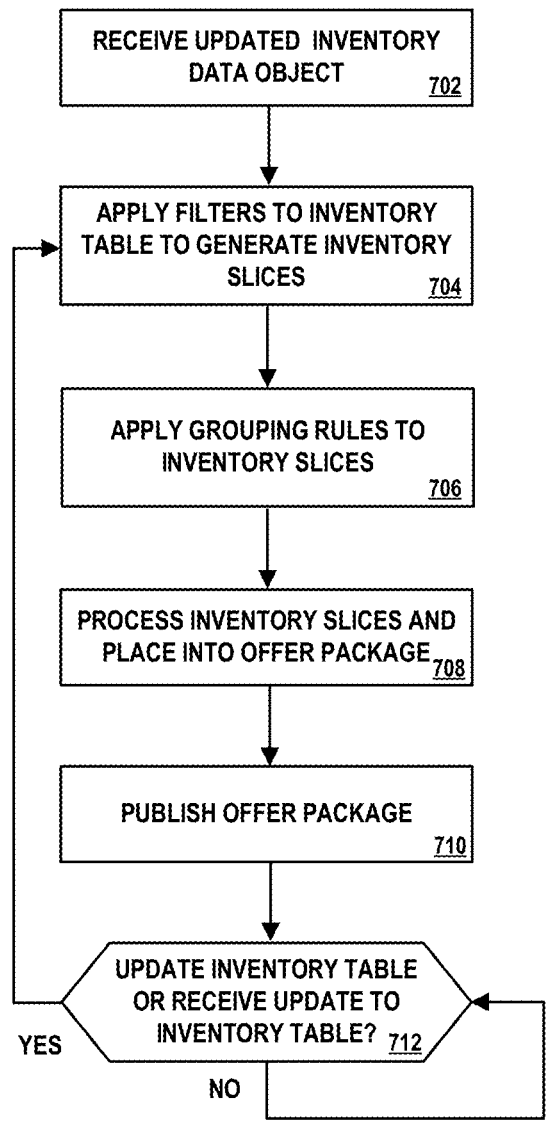
FIG. 7 illustrates an example method to update inventory in a cart interface without the cart interface making backend calls, according to the teachings of this disclosure.

FIG. 7 illustrates an example method to update inventory in a cart interface (e.g., the cart interface 500 FIGS. 5A and 5B) of a network traffic surge resistant platform 102 without generating traffic between the platform 102 and the computing devices 116 hosting the cart interfaces. The platform 102 receives an updated inventory data object 125 (block 702). In some examples, the platform 102 may receive or otherwise retrieve the inventory data object 125 from the IMS of the merchant 104. Alternatively or additionally, in some examples, the platform 102 may maintain an internal copy of the inventory data object 125 that is updated as customers order and is verified by a relatively less frequent update to the inventory data object 125 by the IMS of the merchant 104. The packager 124 then applies the filters specified by the slicer 306 to the updated inventory data object 125 to generate the updated inventory slices 127 (block 704). The packager 124 generates the seat grouping data 307 by applying grouping rules, specified by the contiguity rules 319, to the rows in the inventory slice 127 (block 706). The grouping rules specify which of the seats represented in the rows in the inventory slice 127 are contiguous. The grouping rules may set forth, for example, that contiguous seats are (i) seats that are next to, in the same row, at least one other seat in the set, (ii) seats that are next to, in the same row or column, at least one other seat in the set, or (iii) seats that are next to at least one other seat in the set when (a) they are in the same row and (b) they are in the same column as long as there is no row with only one seat, etc.

The packager 124 processes the updated inventory slices 127 and places them in an updated offer package 120 (e.g., as described in connection with FIGS. 3 and 4 above) (block 708). The platform 102 then published the offer package 120 containing the updated inventory slices 127 to the network storage 110 and 112. (710). The platform 102 waits until an updated inventory data object 125 is received (block 712). When the platform 102 receives an updated inventory data object 125 (YES at block 712), applies the filters specified by the slicer 306 to the updated inventory data object 125 to generate the updated inventory slices 127 (block 704).

Figure 8A:
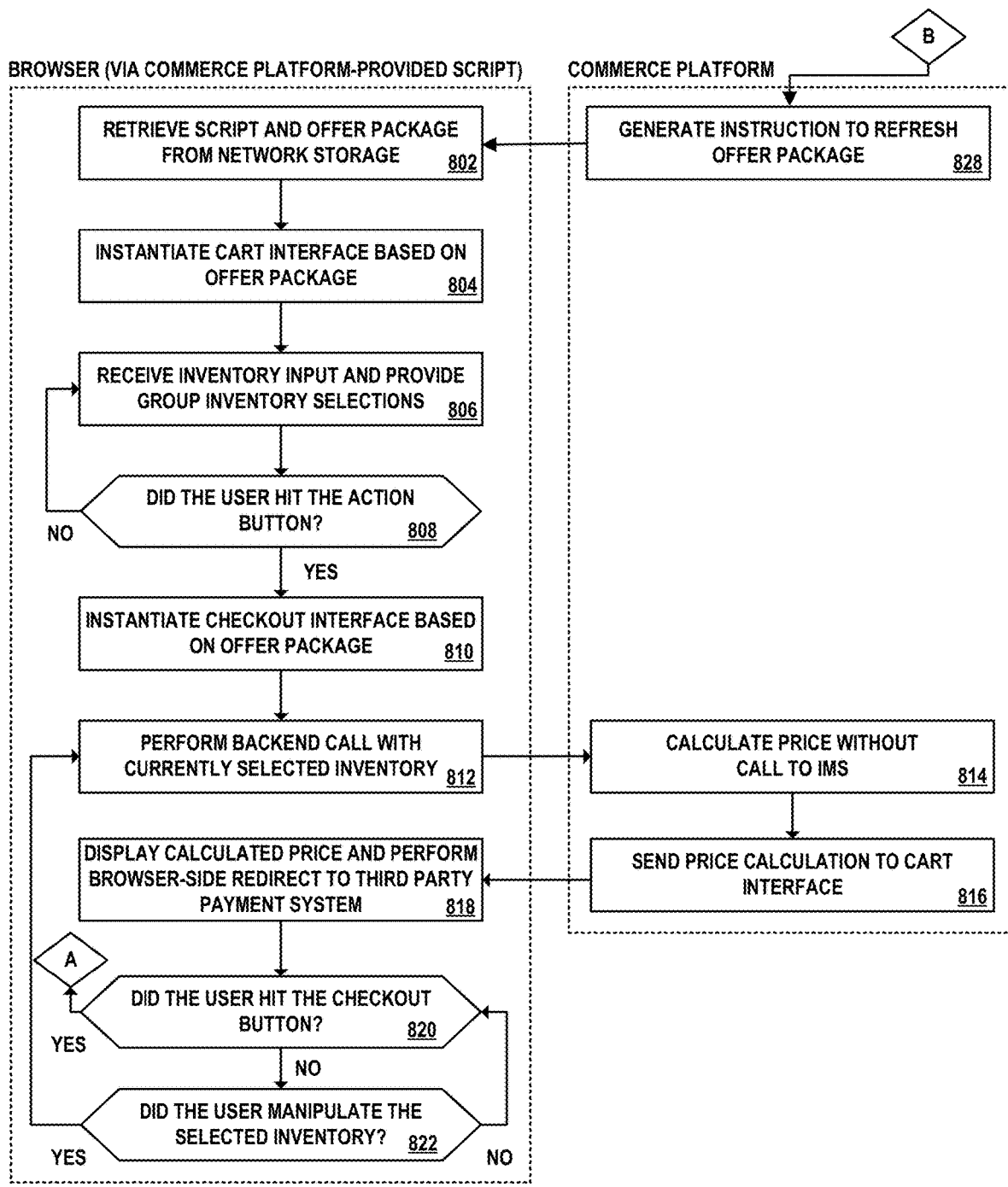
FIGS. 8A and 8B illustrate an example method to provide for a network traffic surge resistant platform, according to the teachings of this disclosure.
Figure 8B:
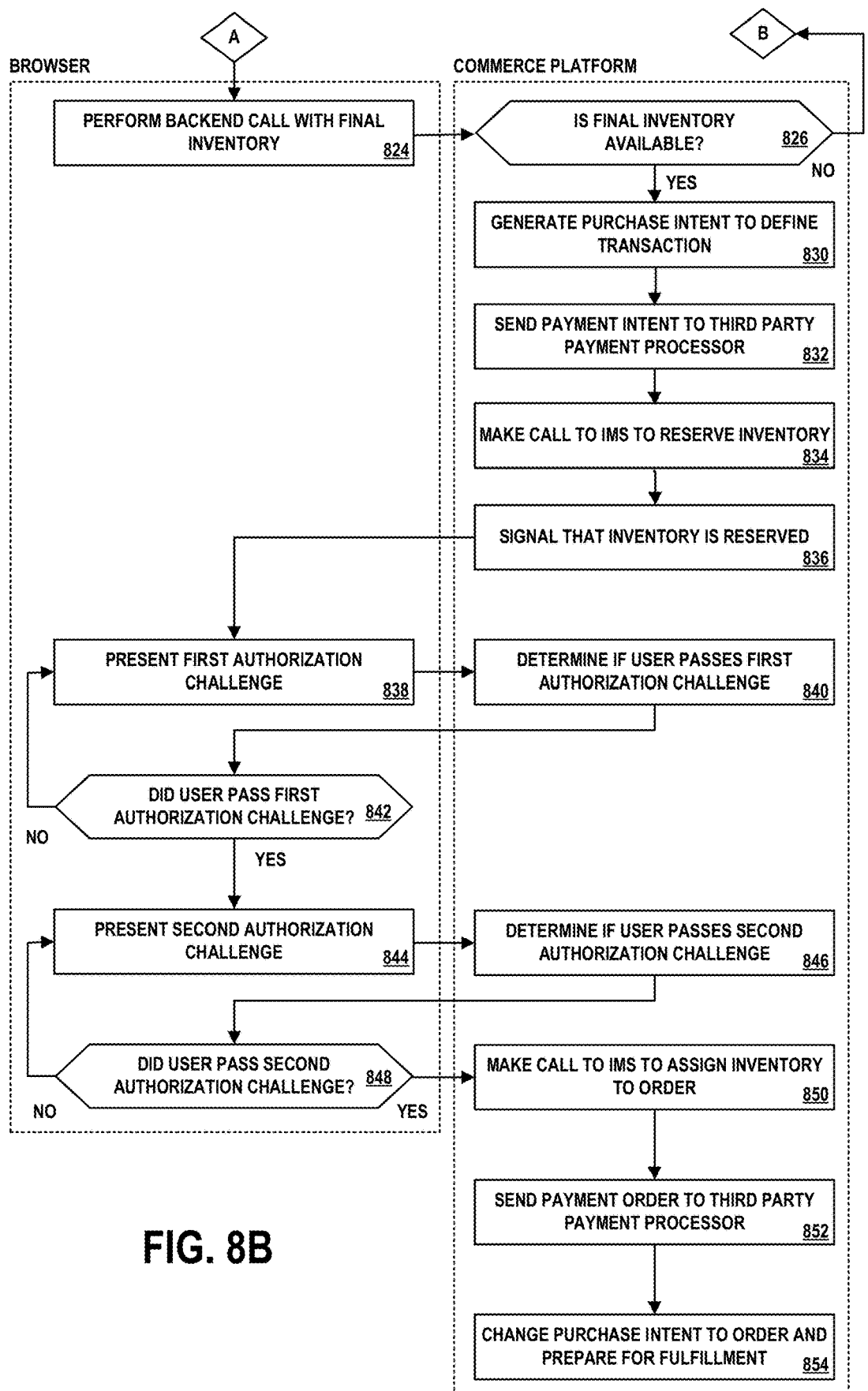

FIGS. 8A and 8B illustrate an example method to provide for a network traffic surge resistant platform 102. The method begins when a user loads the offer instantiator 118 into a browser. For example, the user may click on a URL that directs the browser to the offer instantiator 118. Generally, the method minimizes traffic generated towards the commerce platform 102 and queries into the IMS database 132 until the user has demonstrated that greater network traffic and database resource allocation is appropriate. Interface generation (e.g., the cart interface 500 of FIGS. 5A and 5B, etc.) and initial cart management is performed by the browser using the processing and memory power of the computing device 116.

Initially, the browser, based on the instructions provided by the offer instantiator 118, retrieves the script and offer package 120 from the network storage 112 in the CDN 114 (block 802). The distributive nature of the network storage 112 in the CDN 114, coupled to the relatively low processing and network intense activity of retrieving the script and offer package 120, means that a network traffic surge is not directed at the commerce platform 102 even when a large number of users load the offer instantiator 118 into their browser. The browser, executing the script, instantiates the cart interface in the browser based on the offer package 120 without making any backend calls to the commerce platform 102 (block 804). The browser receives inventory input (e.g., by manipulation of the quantity picker 302, etc.) and estimates the price of the selected inventory based on the offer package 120 without making any backend calls that result in queries to the IMS (block 806). In some examples, the browser (i) receives the inventory input via the quantity picker 302, (ii) provides sets of available seats 516 in the cart interface 500 without making a backend call to the commerce platform 102, (iii) receives a selection of one of the sets of available seats 516, and then (iv) estimates the price of the selected inventory based on the offer package 120 without making any backend calls that result in queries to the IMS. The estimated price may be displayed in the total field 510 of the cart interface 500. The browser waits until it receives an inventory input or the user interacts with the action button 512 (block 808). When the browser receives an inventory input ("NO" at block 808), the browser estimates the price of the selected inventory based on the offer package 120 without making any backend calls that result in queries to the IMS (block 806).

When the browser detects that the user interacts with the action button 512 ("YES" at block 808), the browser, using the script, instantiates the checkout interface based on the offer package 120 (block 810). The user may return to the cart interface (e.g., return to block 804) at any point. The browser, based on the script, performs a backend call to the commerce platform 102 that includes the currently selected inventory of the cart interface (block 812).

The commerce platform 102, in response to receiving the backend call, calculates a price for the currently selected inventory based on the offer package 120 without generating a query to the IMS of the merchant 104 (block 814). The offer package 120 may include obscured and/or encrypted data that the commerce platform 102 is able to unobscure and/or decrypt related to costs beyond the price of the inventory. For example, the commerce platform 102 may calculate the price of the inventory, any fees specified/ allowed by the contract with the merchant 104, and/or taxes to be levied on the purchase. This is a relatively low processing cost calculation. The commerce platform 102 returns the calculated price to the browser that issued the backend call (block 816). In some examples, the commerce platform 102 may, on a copy of the inventory data object 125, track the inventory positions as orders are placed. In such examples, the commerce platform 102 may check to determine whether the goods and/or services indicated by the backend call are available without making a call to the IMS. When the goods and services are not available, the commerce platform 102 may, instead of sending a calculated price to the browser, send an instruction to cause the browser to refresh and retrieve the offer package 120 to cause the browser to update the cart interface.

The browser, using the script, displays the calculated price in the checkout interface and performs a browser-side redirect (sometimes referred to as a "client-side redirect") to the third party payment processor(s) 106 to provide the calculated price (block 818). This allows one or more payment interfaces of the third party payment processor(s) 106 to instantiate within the checkout interface and facilitate payment for the selected inventory. This browser-side redirect means that the resources of the browser, not the commerce platform 102, are used to provide the information necessary for the payment interface(s) to instantiate. Thus, if the user does not proceed with checking out, the network resources used by the user towards the commerce platform 102 have been minimal and no IMS database 132 resources have been expended because of the user.

The browser, using the script, determines whether the user interacts with the checkout button (block 820). When the user does not interact with the checkout button ("NO" at block 820), the browser, using the script, determines whether the user manipulated the selected inventory in the checkout interface (block 822). When the user manipulates the selected inventory ("YES" at block 822), the browser, based on the script, performs a backend call to the commerce platform 102 that includes the currently selected inventory of the cart interface (block 812). When the user does not manipulate the selected inventory ("NO" at block 822), the browser determines whether the user interacts with the checkout button (block 820). When the user interacts with the checkout button ("YES" at block 820), the browser, using the script, performs a backend call that includes the selected inventory (block 824 of FIG. 8B).

The commerce platform 102 determines whether the selected inventory in the backend call is available to be reserved, by, for example, checking the version of the inventory data object 125 being maintained by the commerce platform 102 (block 826). The selected inventory may already have been reserved during a different transaction, for example, because of the large amount of simultaneous users. When the selected inventory is not available ("NO" at block 826), the commerce platform 102 generates an instruction to cause the browser to retrieve the offer package 120 that contains updated inventory slices 127 (block 828 on FIG. 8A). Otherwise, when the selected inventory is available ("YES" at block 826), the commerce platform 102 generates a purchase intent to define the transactions (block 830). The purchase intent is a record of an offer identifier, a browser identifier, an order identifier, a price, and inventory to be purchased, etc. that facilitates tracking an order beginning from the offer instantiator 118 and the offer package 120 to the checkout process such that any transaction can be audited. The purchase intent is linked to the information necessary to verify the content of the transaction.

The commerce platform 102 sends a payment intent to the third party payment processor 106 (block 832). The payment intent may cause the third party payment processor 106 to collect payment information from the user (e.g., via the payment processor widget, etc.) and/or place a hold on funds sufficient to pay the calculated cost. The commerce platform 102 then makes a call to the IMS of the merchant 104 to place a reserve on the selected inventory (block 834). The reserve temporary prevents the entries in the inventory database 132 representative of the inventory from being reserved or otherwise purchased. The commerce platform 102 then signals to the browser that the inventory is reserved (block 836).

The browser, using the script, presents a first authorization challenge (block 838). In some examples, the authorization challenges may be credentials that the user enters where at least one piece of information for the user to enter is a secret (e.g., a user specified password or passcode, an mobile application-based one-time passcode (e.g., a HMAC-based One-time Password algorithm (HOTP) code, a Time-based One-time Password Algorithm (TOTP) code, etc.), a SMS or email-based one-time password (OTP) code, a code provided by a USB or embedded chip based key (sometimes referred to as a "smartcard" or a "security token"), etc.). Upon entry of the answer to the first authorization challenge, via the script, the browser forwards the entry to the commerce platform 102 to determine if the user passes the first authorization challenge.

The commerce platform 102 determines whether the entry provided by the user passes the first authorization challenge and forwards this determination to the browser (block 840). For example, the user may fail the first authorization challenge by entering a mismatched set of credentials, by entering the wrong OTP, and/or waiting too long to enter the OTP. For example, the user may pass the first authorization challenge by entering a matching set of credentials and/or by entering the correct OTP associated with the identifier.

The browser, using the script, determines whether the user passed the first authorization challenge (block 842). When the user does not pass the first authorization challenge ("NO" at block 842), the browser presents a first authorization challenge again (block 844). In some examples, the browser, using the script, may limit the number of times the first authorization challenge may be attempted before, for example, transmitting a message to the commerce platform 102 to end the transaction (e.g., revoking the payment invent and unreserving the inventory, etc.). When the user does passes the first authorization challenge ("YES" at block 842), the browser, using the script, presents a second authorization challenge (block 844). The second authorization challenge requires entry of different secret information than the first authorization challenge that has a different origin than the secret information of the first authorization challenge. For example, the first authorization challenge may be entry of an OTP received from a SMS message and the second authorization challenge may be entry of a different OTP received from an email. In some examples, the authorization challenges may be structured such that they may be performed without the user having an account or prior relationship with the commerce platform 102. In some examples, the first authorization challenge may require entry on a mobile phone number to which the commerce platform 102 sends a first OTP and the second authorization challenge may require entry of an email address to which the commerce platform 102 sends a second OTP. In such examples, these credentials (e.g., the mobile number and email address) may be associated with the purchase intent such that future fulfillment requires entry of the same mobile number-email address pair (e.g., in response to subsequent authorization challenges at the time of fulfillment, etc.). Although two authorization challenges are described wherein, there may be fewer (e.g., one) or more (e.g., three or more) authorization challenges. Upon entry of the answer to the second authorization challenge, via the script, the browser forwards the entry to the commerce platform 102 to determine if the user passes the second authorization challenge.

The commerce platform 102 determines whether the entry provided by the user passes the second authorization challenge and forwards this determination to the browser (block 844). For example, the user may fail the second authorization challenge by entering a mismatched set of credentials, by entering the wrong OTP, and/or waiting too long to enter the OTP. For example, the user may pass the second authorization challenge by entering a matching set of credentials and/or by entering the correct OTP associated with the identifier.

The browser, using the script, determines whether the user passed the second authorization challenge (block 848). When the user does not pass the second authorization challenge ("NO" at block 848), the browser presents a second authorization challenge again (block 844). In some examples, the browser, using the script, may limit the number of times the second authorization challenge may be attempted before, for example, transmitting a message to the commerce platform 102 to end the transaction (e.g., revoking the payment invent and unreserving the inventory, etc.).

When the user passes the second authorization challenge ("YES" at block 848), the commerce platform 102 makes a call to the IMS of the merchant 104 to the selected inventory to be fulfilled (block 850). The commerce platform 102 sends a payment order to the third party payment processor (block 852). The payment order causes the third party payment processor to charge the customer based on the payment intent. The commerce platform changes the purchase intent to a purchase order and prepares for fulfillment (e.g., perform post fulfillment tasks, such as gathering shipping information, etc.) (block 854).

Figure 9:
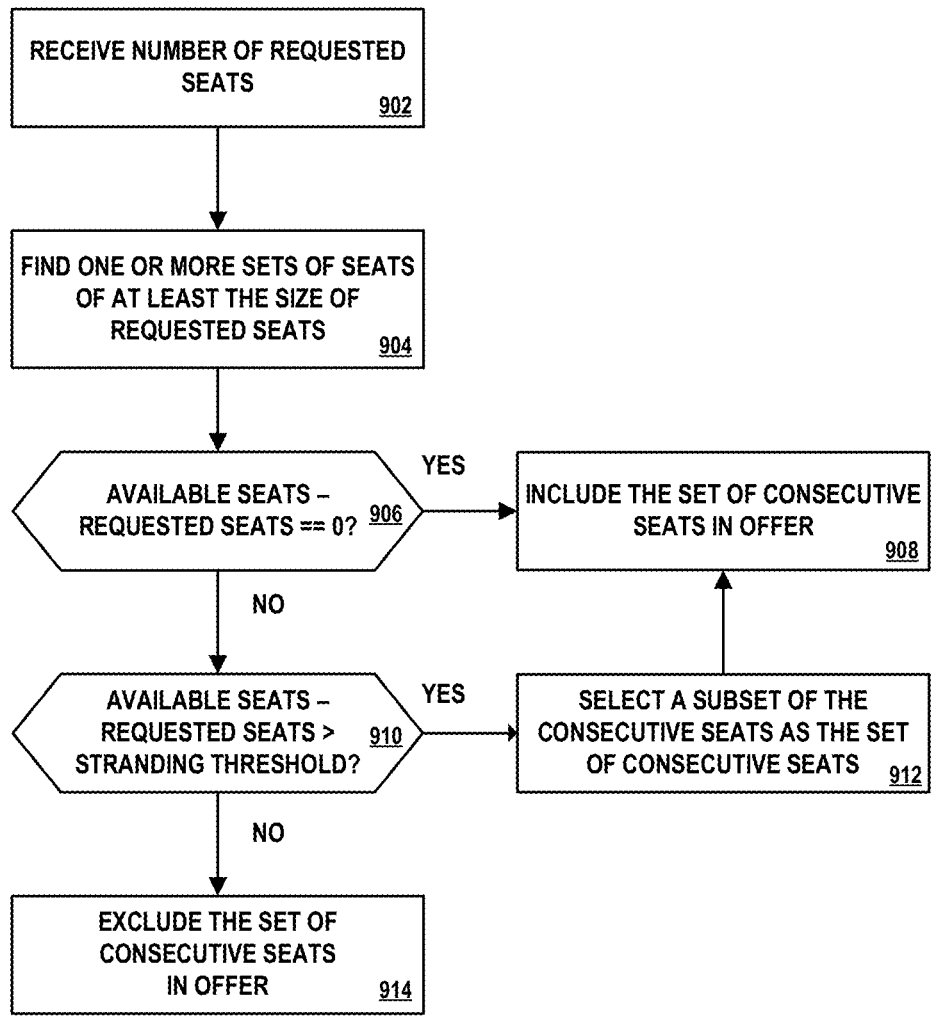
FIG. 9 illustrates an example method to provide for group seating using a network traffic surge resistant platform, according to the teachings of this disclosure.

FIG. 9 illustrates an example method to provide for group seating using the network traffic surge resistant platform 102. Initially, the cart interface 500 receives a number of requested seats (block 902). For example, the cart interface 500 may receive the number of requested seats via the quantity picker 302 that is associated with one of the inventory slices 127. The browser, using the instantiate script and the offer package 120, finds one or more sets of seats (e.g., sets of seats 604A-604D, etc.) that have at least the number requested seats (block 904). In some examples, the browser may use the group seating data 307 included in the corresponding inventory slice 127. For each sets of seat, the browser determines if the number of seats in the set of seats minus the requested seats equals zero (block 906). When the number of seats in the set of seats minus the requested seats equals zero (YES at block 906), the browser includes the set of seats in the sets 516 in the cart interface 500 to be selected (block 908).

Otherwise, when the number of seats in the set of seats minus the requested seats is not equal to zero (NO at block 906), the browser determines if the number of seats in the set of seats minus the requested seats is greater than the contiguity threshold (block 910). When the number of seats in the set of seats minus the requested seats is greater than the contiguity threshold (YES at block 910), the browser includes the set of seats in the sets 516 in the cart interface 500 to be selected (block 908). Otherwise, when the number of seats in the set of seats minus the requested seats is equal to the contiguity threshold (NO at block 910), the browser excludes the set of sets from the sets 516 in the cart interface 500 (block 914).

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The terms "includes," "including," and "include" are inclusive and have the same scope as "comprises," "comprising," and "comprise," respectively. The claims, as follows, are intended to include all modifications and alterations insofar as they come within the scope of the claims or the equivalent thereof

Having thus described the invention, the following is claimed:

1. A network traffic surge resistant system comprising:
   network storage; and
   one or more servers configured as a commerce platform configured to:
   generate a script, a first offer package, and an offer instantiator, and store the script and the first offer package onto the network storage, the offer instantiator providing the location of the script and the first offer package in the network storage, and the offer package including a set of inventory slices that each specify group ticket data of contiguous seats represented in the inventory slice; and
   wherein, in response to a browser operating on a computing device accessing the offer instantiator:
   the offer instantiator causes the browser to retrieve the script and the offer package from the network storage;
   the script causes the browser to instantiate a cart interface within the browser based on the offer package using the resources of the computing device without making a backend call to the commerce platform, the cart interface including a set of inventory items based on the first set of inventory slices; and
   in response to receiving a selection of a quantity of the inventory items associated with one of the inventory slices, the script causes the browser to present, in the cart interface, at least one group of seats for selection based on group ticket data and contiguity rules included in the offer package.

2. The system of claim 1, wherein the contiguity rules specify a contiguity threshold used to determine which sets of seats in the group ticket data are candidate sets of seats to contain one of the group of seats to be presented in the cart interface.

3. The system of claim 2, wherein to determine which of the sets of seats in the group ticket data are candidates to contain one of the group of seats to be presented in the cart interface, the script causes the browser to, for each of the sets of seats in the group ticket data associated with the selected inventory slice, compare a number of seats minus the selected quantity of the inventory items in the set of seats to the contiguity threshold.

4. The system of claim 3, wherein when the number of seats in the set of seats minus the selected quantity of the inventory items is less than zero, determine that the sets of seat is not one of the candidates to contain one of the group of seats to be presented in the cart interface.

5. The system of claim 3, wherein when the number of seats in the set of seats minus the selected quantity of the inventory items equal zero, determine that the sets of seat is one of the candidates to contain one of the group of seats to be presented in the cart interface.

6. The system of claim 3, wherein when the number of seats in the set of seats minus the selected quantity of the inventory items equals the contiguity threshold, determine that the sets of seat is not one of the candidates to contain one of the group of seats to be presented in the cart interface.

7. The system of claim 3, wherein when the number of seats in the set of seats minus the selected quantity of the inventory items is greater than the congruity threshold, determine that the sets of seat is one of the candidates to contain one of the group of seats to be presented in the cart interface.

8. The system of claim 2, wherein the contiguity rules specify a maximum number of the group of seats that are to be presented in the cart interface.

9. The system of claim 2, wherein the script causes the browser to:
 filter the sets of seats in the group ticket data to determine the candidate sets of seats based on the contiguity threshold; and
 select contiguous seats from the candidate sets of seats to be the one of the group of seats to be presented in the cart interface.

10. The system of claim 9, wherein the script causes the browser to select the contiguous seats from the candidate sets of seats to be the one of the group of seats to be presented in the cart interface based on prioritization rules included in the contiguity rules.

11. A method to provide a network traffic surge resistant system, the method comprising:
 generating a script, a first offer package, and an offer instantiator, and storing the script and the first offer package onto the network storage, the offer instantiator providing the location of the script and the first offer package in the network storage, and the offer package including a set of inventory slices that each specify group ticket data of contiguous seats represented in the inventory slice; and
 in response to a browser operating on a computing device accessing the offer instantiator:
  causing, by the offer instantiator, the browser to retrieve the script and the offer package from the network storage;
  causing, by the script, the browser to instantiate a cart interface within the browser based on the offer package using the resources of the computing device without making a backend call to the commerce platform, the cart interface including a set of inventory items based on the first set of inventory slices; and
  in response to receiving a selection of a quantity of the inventory items associated with one of the inventory slices, causing, by the script, the browser to present, in the cart interface, at least one group of seats for selection based on group ticket data and contiguity rules included in the offer package.

12. The method of claim 11, wherein the contiguity rules specify a contiguity threshold used to determine which sets of seats in the group ticket data are candidate sets of seats to contain one of the group of seats to be presented in the cart interface.

13. The method of claim 12, wherein determining which of the sets of seats in the group ticket data are candidates to contain one of the group of seats to be presented in the cart interface, causing, by the script, the browser to, for each of the sets of seats in the group ticket data associated with the selected inventory slice, compare a number of seats minus the selected quantity of the inventory items in the set of seats to the contiguity threshold.

14. The method of claim 13, wherein when the number of seats in the set of seats minus the selected quantity of the inventory items is less than zero, determine that the sets of seat is not one of the candidates to contain one of the group of seats to be presented in the cart interface.

15. The method of claim 13, wherein when the number of seats in the set of seats minus the selected quantity of the inventory items equal zero, determine that the sets of seat is one of the candidates to contain one of the group of seats to be presented in the cart interface.

16. The method of claim 13, wherein when the number of seats in the set of seats minus the selected quantity of the inventory items equals the contiguity threshold, determine that the sets of seat is not one of the candidates to contain one of the group of seats to be presented in the cart interface.

17. The method of claim 13, wherein when the number of seats in the set of seats minus the selected quantity of the inventory items is greater than the congruity threshold, determine that the sets of seat is one of the candidates to contain one of the group of seats to be presented in the cart interface.

18. The method of claim 12, wherein the contiguity rules specify a maximum number of the group of seats that are to be presented in the cart interface.

19. The method of claim 12, further comprising cause, by the script, the browser to:
 filter the sets of seats in the group ticket data to determine the candidate sets of seats based on the contiguity threshold; and
 select contiguous seats from the candidate sets of seats to be the one of the group of seats to be presented in the cart interface.

20. The method of claim 19, further comprising causing, by the script, the browser to select the contiguous seats from the candidate sets of seats to be the one of the group of seats to be presented in the cart interface based on prioritization rules included in the contiguity rules.

\* \* \* \* \*